(12) United States Patent
Shiota et al.

(10) Patent No.: US 12,508,070 B2
(45) Date of Patent: Dec. 30, 2025

(54) ENDOSCOPE TREATMENT TOOL

(71) Applicant: OLYMPUS MEDICAL SYSTEMS CORP., Tokyo (JP)

(72) Inventors: Yusuke Shiota, Machida (JP); Kotaro Yamada, Tachikawa (JP); Hiromasa Kato, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 470 days.

(21) Appl. No.: 17/974,664

(22) Filed: Oct. 27, 2022

(65) Prior Publication Data

US 2023/0133812 A1 May 4, 2023

Related U.S. Application Data

(60) Provisional application No. 63/273,167, filed on Oct. 29, 2021.

(51) Int. Cl.
*A61B 18/14* (2006.01)
*A61B 1/00* (2006.01)
(Continued)

(52) U.S. Cl.
CPC ...... *A61B 18/1492* (2013.01); *A61B 1/00133* (2013.01); *A61B 1/018* (2013.01);
(Continued)

(58) Field of Classification Search
CPC . A61B 18/1492; A61B 1/00133; A61B 1/018; A61B 2018/00982;
(Continued)

(56) References Cited

U.S. PATENT DOCUMENTS 5,460,629 A * 10/1995 Shlain ............... A61B 18/1482
606/49
6,325,800 B1 * 12/2001 Durgin ............. A61B 18/1492
606/41
(Continued)

FOREIGN PATENT DOCUMENTS

| CN | 108272503 A | 7/2018 |
| CN | 111202485 A | 5/2020 |
| JP | 2012-523863 A | 10/2012 |

OTHER PUBLICATIONS

Office Action dated Mar. 27, 2025, issued in corresponding Chinese Patent Application No. 202211327375.X.

*Primary Examiner* — Julian W Woo
(74) *Attorney, Agent, or Firm* — Morgan, Lewis & Bockius LLP

(57) ABSTRACT

An endoscope treatment tool includes a sheath, a knife, a connecting unit and a body. The sheath includes a first channel opened at a distal end of the sheath. The knife inserted into the first channel, the knife having a second channel extending from a distal end of the knife to a proximal end of the knife. The connecting unit is located inside the sheath, the connecting unit including a cavity internal to the connecting unit and defining a storage path. A cross-sectional area of the cavity is larger than a cross-sectional area of the second channel. The body disposed in the cavity. The body is translatable in the cavity between a first position and a second position. The body forms a passage and, in the first position, the passage is in communication with the second channel.

17 Claims, 17 Drawing Sheets

(51) Int. Cl.
*A61B 1/018* (2006.01)
*A61B 18/00* (2006.01)

(52) U.S. Cl.
CPC ............... *A61B 2018/00982* (2013.01); *A61B 2218/002* (2013.01)

(58) Field of Classification Search
CPC .......... A61B 2218/002; A61B 1/00131; A61B 2018/00601; A61B 2018/1412; A61B 2018/1475; A61B 18/14
See application file for complete search history.

(56) References Cited

U.S. PATENT DOCUMENTS

| | | | |
|---|---|---|---|
| 7,651,494 B2* | 1/2010 | McClurken | A61B 18/1442 |
| | | | 606/49 |
| 10,631,924 B2* | 4/2020 | Hidaka | A61B 1/00087 |
| 11,224,480 B2* | 1/2022 | Smith | A61M 25/0082 |
| 12,108,975 B2* | 10/2024 | Hu | A61B 18/1492 |
| 2012/0035607 A1 | 2/2012 | Karwei | |
| 2015/0238219 A1 | 8/2015 | Karwei | |
| 2019/0298435 A1 | 10/2019 | Estevez et al. | |
| 2019/0328451 A1* | 10/2019 | Smith | A61B 18/1477 |
| 2021/0113260 A1 | 4/2021 | Tang et al. | |
| 2022/0000344 A1 | 1/2022 | Tang et al. | |

* cited by examiner

ENDOSCOPE TREATMENT TOOL

RELATED APPLICATION DATA

This application is based on and claims priority under 35 U.S.C. § 119 to U.S. Provisional Application No. 63/273,167, filed Oct. 29, 2021, the entire contents of which are incorporated herein by reference.

FIELD OF THE DISCLOSURE

The present disclosure relates to an endoscope treatment tool.

BACKGROUND

In Endoscopic Submucosal Dissection (ESD), treatment tools for incision and dissection, such as high frequency knives, and treatment tools for local injection and hemostasis are used (see, for example, CN 111202485 A, JP 2012-523863 A, and CN 108272503 A).

CN 111202485 A and JP 2012-523863 A disclose treatment tools for an endoscope, which are capable of performing tissue incision treatment and local injection treatment.

In addition, in a case where local injection treatment, blood washing, and the like are performed, as disclosed in CN 108272503 A, a method of discharging a liquid from a distal end of an electrode for incision and dissection is known.

SUMMARY OF DISCLOSURE

In some embodiments, an endoscope treatment tool includes a sheath, a knife, a connecting unit and a body. The sheath includes a first channel opened at a distal end of the sheath. The knife is inserted into the first channel, the knife having a second channel extending from a distal end of the knife to a proximal end of the knife. The connecting unit is located inside the sheath, the connecting unit including a cavity internal to the connecting unit and defining a storage path. A cross-sectional area of the cavity is larger than a cross-sectional area of the second channel. The body is disposed in the cavity. The body is translatable in the cavity between a first position and a second position. The body forms a passage and, in the first position, the passage is in communication with the second channel.

DETAILED DESCRIPTION

Figure 1:
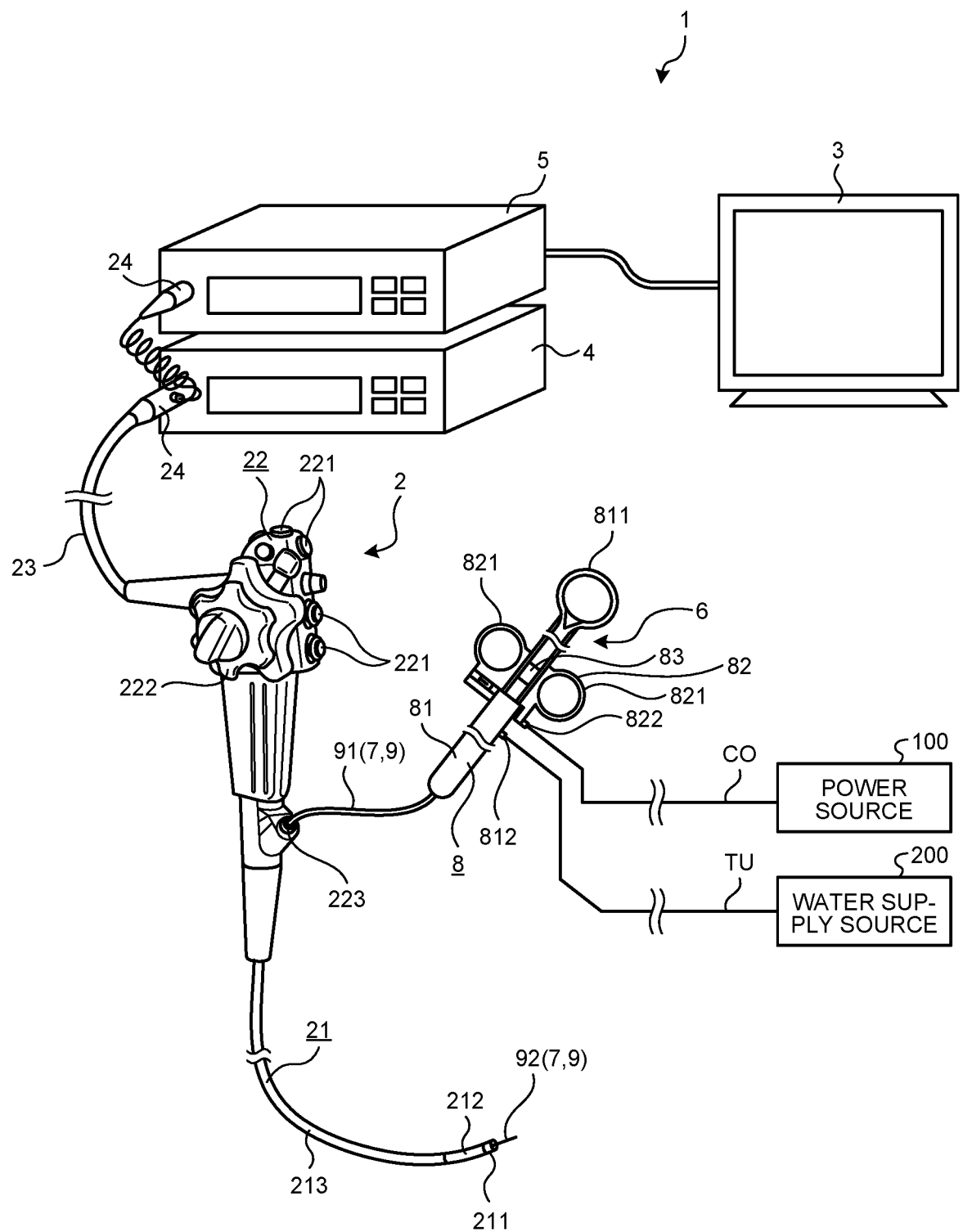
FIG. 1 is a diagram illustrating an endoscope system according to a first embodiment.

Hereinafter, modes for carrying out the disclosure (hereinafter referred to as embodiments) will be described with reference to the drawings. It is noted that the disclosure is not limited to the embodiments described below. Furthermore, in the description of the drawings, the same reference numerals are assigned to the same parts.

First Embodiment

Configuration of Endoscope System

FIG. 1 is a diagram illustrating an endoscope system 1 according to a first embodiment.

The endoscope system 1 is a system that is used in the medical field and treats a site to be treated in a living tissue inside a body cavity (hereinafter referred to as a target site) by applying high frequency energy to the target site while observing the body cavity. It is noted that the treatment that can be performed by the endoscope system 1 according to the first embodiment is a treatment such as coagulation (sealing) of the target site or incision of the target site. As illustrated in FIG. 1, the endoscope system 1 includes an endoscope 2, a display device 3, a light source device 4, a control device 5, and a treatment tool 6 for an endoscope.

The endoscope 2 is partially inserted into the body cavity, captures a subject image reflected from the body cavity, and outputs an image signal generated by the image capture. As illustrated in FIG. 1, the endoscope 2 includes an endoscope insertion portion 21, an endoscope operating portion 22, a universal cord 23, and a connector portion 24.

The endoscope insertion portion 21 is a portion that is at least partially flexible and is inserted into the body cavity. As illustrated in FIG. 1, the endoscope insertion portion 21 includes a distal end unit 211, a bendable portion 212, and a flexible tube 213.

The distal end unit 211 is provided at the distal end of the endoscope insertion portion 21. Although the specific illustration is omitted, the distal end unit 211 is provided with an illumination optical system, an imaging optical system, and an imaging unit.

The illumination optical system faces one end of a light guide (not illustrated) routed in the endoscope insertion portion 21 and irradiates light transmitted by the light guide onto the inside of the body cavity from the distal end of the endoscope insertion portion 21.

The imaging optical system irradiates light onto the inside of the body cavity from the illumination optical system, takes in the light (subject image) reflected from the inside of the body cavity, and forms an image on an imaging surface of an image sensor constituting the imaging unit.

The imaging unit is configured to include an image sensor, such as a Charge Coupled Device (CCD) or a Complementary Metal Oxide Semiconductor (CMOS). The imaging unit captures a subject image formed by the imaging optical system and outputs an image signal generated by the image capture.

The bendable portion 212 is connected to the proximal end side (endoscope operating portion 22 side) of the distal end unit 211. Although the specific illustration is omitted, the bendable portion 212 has a configuration in which a plurality of curved pieces are connected to each other and the bendable portion 212 can be curved.

The flexible tube 213 is connected to the proximal end side (endoscope operating portion 22 side) of the bendable portion 212 and has an elongated shape and flexibility.

The endoscope operating portion 22 is connected to the proximal end portion of the endoscope insertion portion 21. The endoscope operating portion 22 accepts various operations on the endoscope 2. As illustrated in FIG. 1, the endoscope operating portion 22 is provided with a plurality of operation members 221, a curved knob 222, and an insertion port 223.

The plurality of operation members 221 are configured by buttons or the like that accept various operations.

The curved knob 222 is configured to be rotatable according to a user operation. Therefore, the curved knob 222 rotates to operate a bending mechanism (not illustrated) of a metal or resin wire or the like disposed in the endoscope insertion portion 21. Due to this, the bendable portion 212 is curved.

The insertion port 223 is an insertion port which communicates with a pipeline (not illustrated) extending from the distal end to the proximal end side (endoscope operating portion 22 side) of the endoscope insertion portion 21 and allows a treatment tool insertion portion 7 or the like in the treatment tool 6 for an endoscope to be inserted into the pipeline from the outside.

The universal cord 23 is a cord which extends from the endoscope operating portion 22 in a direction different from the extension direction of the endoscope insertion portion 21 and in which the above-described light guide, a signal line for transmitting the above-described image signal, and the like are disposed.

The connector portion 24 is provided at the end of the universal cord 23 and is detachably connected to the light source device 4 and the control device 5.

The display device 3 is a Liquid Crystal Display (LCD), an Electro Luminescence (EL) display, or the like, and displays a predetermined image under the control of the control device 5.

The light source device 4 emits illumination light. The illumination light, which is emitted from the light source device 4, passes through the connector portion 24, the universal cord 23, the endoscope operating portion 22, and the light guide and the illumination optical system routed in the endoscope insertion portion 21, and is then irradiated from the distal end of the endoscope insertion portion 21 toward the inside of the body cavity.

The control device 5 is configured to include a Central Processing Unit (CPU), a Field-Programmable Gate Array (FPGA), and the like, and controls overall operations of the display device 3 and the light source device 4.

For example, the control device 5 generates an endoscopic image by performing predetermined processing on the image signal input from the above-described imaging unit through the above-described signal line. The control device 5 controls the operation of the display device 3 and causes the display device 3 to display the endoscopic image or the like.

It is noted that, in the first embodiment, the light source device 4 and the control device 5 are configured separately, but may be integrally provided in one housing.

Configuration of Treatment Tool for Endoscope

The treatment tool 6 for an endoscope is, for example, a treatment tool used in Endoscopic Submucosal Dissection (ESD). As illustrated in FIG. 1, the treatment tool 6 for an endoscope includes the treatment tool insertion portion 7 and a treatment tool operating portion 8.

As illustrated in FIG. 1, the treatment tool insertion portion 7 is a portion that passes through the pipeline in the endoscope insertion portion 21 from the insertion port 223, protrudes from the distal end of the endoscope insertion portion 21, and is inserted into the body cavity. The treatment tool insertion portion 7 corresponds to an insertion portion.

It is noted that the detailed configuration of the treatment tool insertion portion 7 will be described in "Configuration of treatment tool insertion portion" described below. In addition, the "distal end" shown below means one end of the treatment tool insertion portion 7 in the insertion direction, and the "proximal end" shown below means the other end of the treatment tool insertion portion 7 on the side opposite to the insertion direction.

The treatment tool operating portion 8 is connected to the proximal end portion of the treatment tool insertion portion 7. The treatment tool operating portion 8 receives the operation on the treatment tool 6 for an endoscope. As illustrated in FIG. 1, the treatment tool operating portion 8 includes an operating portion body 81, a first slider 82, and a second slider 83.

The operating portion body 81 has an elongated shape, and a proximal end portion of a sheath 9, described below, constituting the treatment tool insertion portion 7 is fixed thereto. In addition, as illustrated in FIG. 1, a ring 811 for an operator such as an operating surgeon to hang his or her finger is provided at the proximal end portion of the operating portion body 81. Furthermore, the operating portion body 81 is provided with a water supply port 812 to which a tube TU is connected. A physiological saline solution is supplied from a water supply source 200, such as a pump, to the water supply port 812 via the tube TU.

Here, the physiological saline solution corresponds to a fluid. It is noted that the fluid is not limited to the physiological saline solution, and other liquids and gases such as air may be adopted.

The first slider 82 is attached to the operating portion body 81 so as to be movable along the longitudinal direction of the operating portion body 81 according to an operation by an operator such as an operating surgeon. As illustrated in FIG.

1, the first slider 82 is provided with a pair of rings 821 for an operator such as an operating surgeon to hang his or her finger. In addition, the first slider 82 is provided with a plug 822 to which a power cord CO is connected. The plug 822 is electrically connected to a power source 100 via the power cord CO.

The second slider 83 is attached to the operating portion body 81 so as to be movable along the longitudinal direction of the operating portion body 81 according to an operation by an operator such as an operating surgeon. It is noted that the second slider 83 is movable along the longitudinal direction of the operating portion body 81 in a state of being independent of the first slider 82.

Configuration of Treatment Tool Insertion Portion

Figure 2:
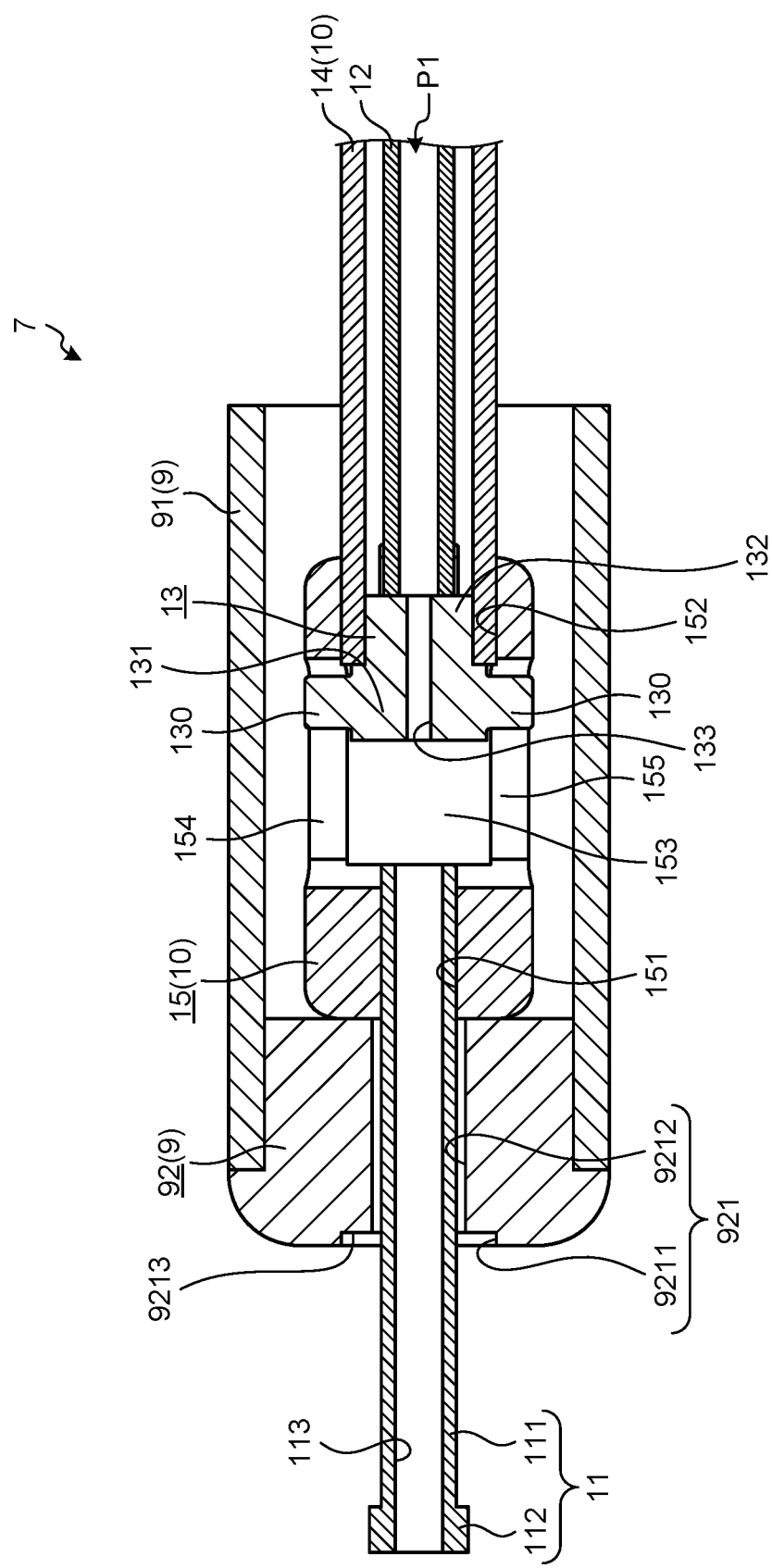
FIG. 2 is a diagram for describing a configuration of a treatment tool insertion portion.
Figure 3:
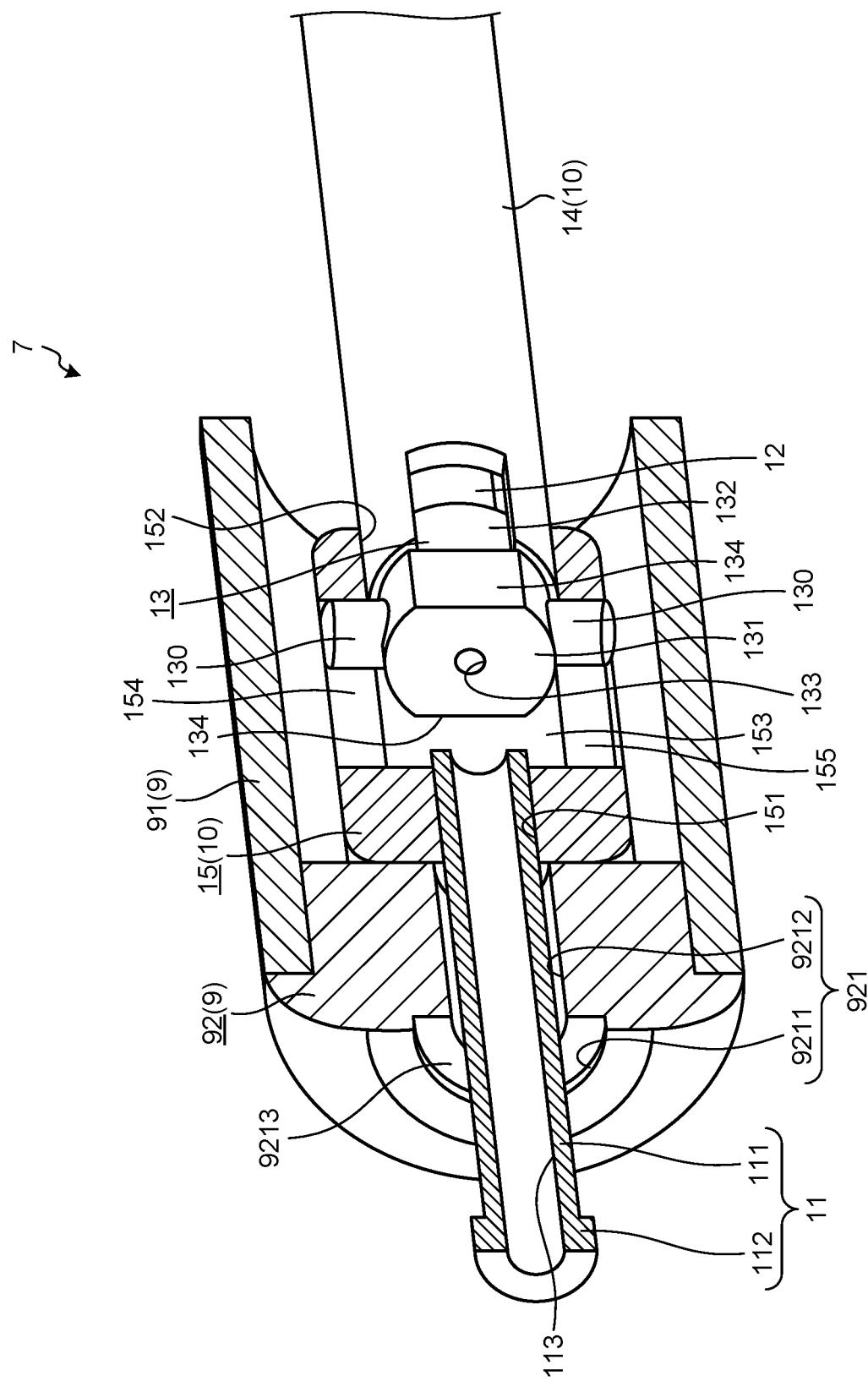
FIG. 3 is a diagram for describing a configuration of a treatment tool insertion portion.

FIGS. 2 and 3 are diagrams for describing the configuration of the treatment tool insertion portion 7. Specifically, FIG. 2 is a cross-sectional view in which the distal end portion of the treatment tool insertion portion 7 is cut by a plane including the central axis of the treatment tool insertion portion 7. In addition, FIG. 3 is a diagram illustrating the inside of the sheath 9 at the distal end portion of the treatment tool insertion portion 7. It is noted that, in FIG. 3, only the sheath 9, a knife 11, and a connecting portion 15 in the distal end portion of the treatment tool insertion portion 7 are cut. The connecting portion 15 may correspond to a connecting unit.

As illustrated in FIGS. 1 to 3, the treatment tool insertion portion 7 includes a sheath 9, a second advancing/retreating portion (second tube body) 10 (FIGS. 2 and 3), a knife 11 (FIGS. 2 and 3), a first advancing/retreating portion (first tube body) 12 (FIGS. 2 and 3), and a passage forming portion 13 (FIGS. 2 and 3). The second advancing/retreating portion 10 may correspond to a second member. The first advancing/retreating portion 12 may correspond to a first member. The passage forming portion 13 may correspond to a body.

The sheath 9 is a portion that constitutes the outer surface of the treatment tool insertion portion 7. As illustrated in FIGS. 1 to 3, the sheath 9 includes a sheath body 91 and a distal end part 92.

The sheath body 91 is a cylindrical member made of a resin material or the like and having insulating properties and flexibility. The proximal end portion of the sheath body 91 is fixed to the operating portion body 81.

The distal end part 92 is configured by a substantially cylindrical member. The distal end part 92 may be made of a member having electrical insulating properties, including ceramic, a resin material, rubber, or the like, or may be made of a member on which insulating coating or the like is performed on a surface of a metal or the like. The distal end part 92 is inserted through the distal end portion of the sheath body 91 and closes the distal end portion thereof. As illustrated in FIGS. 2 and 3, the distal end part 92 is provided with a first hole 921 that communicates with the inside and outside of the sheath 9. The first hole 921 may correspond to a first channel.

The first hole 921 has a circular cross-sectional shape, is located on the central axis of the distal end part 92, and extends linearly along the central axis thereof. In addition, the first hole 921 has a stepped shape in which the distal end portion has a larger inner diameter than the proximal end portion. In the following, for convenience of explanation, a portion of the first hole 921 having a large inner diameter dimension on the distal end side is referred to as a large diameter portion 9211 (FIGS. 2 and 3), and a portion of the first hole 921 having a small inner diameter dimension on the proximal end side is referred to as a small diameter portion 9212 (FIGS. 2 and 3). In addition, a stepped portion between the large diameter portion 9211 and the small diameter portion 9212 is referred to as a first stepped portion 9213 (FIGS. 2 and 3).

The second advancing/retreating portion 10 is a member that is inserted into the sheath body 91 and advances and retreats the knife 11 along the central axis of the sheath 9. As illustrated in FIGS. 2 and 3, the second advancing/retreating portion 10 includes a second advancing/retreating portion body 14 and a connecting portion 15.

The second advancing/retreating portion body 14 is a cylindrical flexible coil that is made of, for example, a conductive material such as a metal, is located inside the sheath 9, and extends along the central axis of the sheath 9. The proximal end portion of the second advancing/retreating portion body 14 is fixed to the first slider 82. That is, the second advancing/retreating portion 10 advances and retreats in the sheath body 91 according to an operation on the first slider 82 by an operator such as an operating surgeon. In addition, the second advancing/retreating portion body 14 is electrically connected to the plug 822.

The connecting portion 15 is a member that connects the second advancing/retreating portion 10 to the knife 11. The connecting portion 15 is made of a conductive material such as a metal, is located inside the sheath 9, and has a cylindrical shape extending linearly along the central axis of the sheath 9.

As illustrated in FIG. 2 or FIG. 3, the connecting portion 15 is provided with first and second fitting holes 151 and 152, a storage hole 153, and a pair of guide holes 154 and 155.

The first fitting hole 151 corresponds to a fitting hole. The fitting hole may correspond to a fitting channel. The first fitting hole 151 is a circular hole located on the central axis of the connecting portion 15 and extending linearly from the distal end of the connecting portion 15 toward the proximal end side along the central axis thereof. The proximal end of the knife 11 is fixed to the first fitting hole 151 in a state of being inserted therethrough.

The second fitting hole 152 is a circular hole located on the central axis of the connecting portion 15 and extending linearly from the proximal end of the connecting portion 15 toward the distal end side along the central axis thereof. The second advancing/retreating portion body 14 is fixed to the second fitting hole 152 in a state of being inserted therethrough. That is, the connecting portion 15 advances and retreats in the sheath body 91 together with the second advancing/retreating portion body 14 according to an operation on the first slider 82 by an operator such as an operating surgeon.

The connecting portion 15 described above may be formed as one component, or may be configured by joining two or more components by bonding, adhering, or the like.

The storage hole 153 corresponds to a storage path. And the storage path may correspond to a cavity. The storage hole 153 is a circular hole located on the central axis of the connecting portion 15 and extending linearly from the distal end side of the connecting portion 15 toward the proximal end side along the central axis thereof, and communicates with the first and second fitting holes 151 and 152. As illustrated in FIG. 2 or FIG. 3, the passage forming portion 13 is housed in the storage hole 153.

It is noted that the inner diameter dimensions of the second fitting hole 152 and the storage hole 153 are set to be substantially equal to each other. In addition, the inner diameter dimension of the first fitting hole 151 is set to be smaller than the inner diameter dimensions of the second fitting hole 152 and the storage hole 153.

The pair of guide holes 154 and 155 are elongated holes extending in the left-and-right direction in FIG. 2 while penetrating from the upper and lower outer peripheral surfaces to the storage hole 153 in the connecting portion 15 in FIG. 2. As illustrated in FIG. 2 or FIG. 3, a pair of guide protrusions 130 provided in the passage forming portion 13 are inserted into the pair of guide holes 154 and 155, respectively.

It is noted that the outer peripheral surface of the second advancing/retreating portion 10 described above is made of a resin material or the like and is covered with a cylindrical inner tube (not illustrated) having insulating properties and flexibility.

The knife 11 is made of a conductive material such as a metal and is fixed in a state where the proximal end portion thereof is inserted into the first fitting hole 151 and protrudes into the storage hole 153. That is, the knife 11 advances and retreats in the sheath body 91 together with the second advancing/retreating portion 10 according to an operation on the first slider 82 by an operator such as an operating surgeon. In addition, the knife 11 protrudes from the first hole 921 to the outside of the distal end part 92. The knife 11 is energized with a high frequency current from the power source 100 via the power cord CO, the plug 822, the second advancing/retreating portion body 14, and the connecting portion 15, and incises the target site in the body cavity. As illustrated in FIG. 2 or FIG. 3, the knife 11 includes a knife body 111 and a protrusion portion 112.

The knife body 111 is located on the central axis of the distal end part 92 and is configured by a cylindrical member extending linearly along the central axis thereof. Here, as illustrated in FIG. 2 or FIG. 3, the outer diameter dimension of the knife body 111 is set to be slightly smaller than the inner diameter dimension of the first hole 921.

The protrusion portion 112 is provided at the distal end of the knife body 111 and has a disk shape that is coaxial with the central axis of the knife body 111. The outer diameter dimension of the protrusion portion 112 is set to be larger than the outer diameter dimension of the knife body 111 and slightly smaller than the inner diameter dimension of the large diameter portion 9211.

As illustrated in FIG. 2 or FIG. 3, the knife 11 described above is provided with a second hole 113 that is located on the central axis of the knife body 111 and penetrates from the proximal end to the distal end of the knife 11 along the central axis thereof. The second hole 113 may correspond to a second channel. The second hole 113 communicates with the storage hole 153 by connecting the knife 11 to the second advancing/retreating portion 10. Here, the cross-sectional area of the second hole 113 orthogonal to the central axis is smaller than the cross-sectional area of the storage hole 153 orthogonal to the central axis.

The first advancing/retreating portion 12 is a member that is inserted into the second advancing/retreating portion body 14 and advances and retreats the passage forming portion 13 along the central axis of the sheath 9. The first advancing/retreating portion 12 is a cylindrical flexible coil that is made of, for example, a conductive material such as a metal, is located on the central axis of the second advancing/retreating portion body 14, and extends linearly along the central axis thereof. The proximal end portion of the first advancing/retreating portion 12 is fixed to the second slider 83. That is, the first advancing/retreating portion 12 advances and retreats in the second advancing/retreating portion body 14 according to an operation on the second slider 83 by an operator such as an operating surgeon. In addition, the inside of the first advancing/retreating portion 12 communicates with the water supply port 812. Then, the inside of the first advancing/retreating portion 12 functions as a main passage P1 (FIG. 2), through which the physiological saline solution supplied from the water supply source 200 flows via the tube TU and the water supply port 812.

The passage forming portion 13 is a portion that is made of a metal material or a resin material and adjusts the cross-sectional area of the passage between the main passage P1 and the second hole 113, and is disposed to be able to advance or retreat in the storage hole 153. As illustrated in FIG. 2 or FIG. 3, the passage forming portion 13 includes a contact portion 131 and a proximal end portion 132.

The contact portion 131 is located on the central axis of the connecting portion 15 and has a cylindrical shape extending linearly along the central axis thereof. Here, the outer diameter dimension of the contact portion 131 is set to be slightly smaller than the inner diameter dimension of the storage hole 153.

The proximal end portion 132 is a portion that connects the first advancing/retreating portion 12 to the passage forming portion 13. The proximal end portion 132 is provided at the proximal end of the contact portion 131 and has a cylindrical shape that is coaxial with the central axis of the contact portion 131. Here, the outer diameter dimension of the proximal end portion 132 is set to be smaller than the outer diameter dimension of the contact portion 131 and slightly smaller than the inner diameter dimension of the second advancing/retreating portion body 14.

As illustrated in FIG. 2 or FIG. 3, the passage forming portion 13 described above is provided with a third hole (passage) 133 that is located on the central axis of the contact portion 131 and penetrates from the proximal end to the distal end of the passage forming portion 13 along the central axis thereof. The third hole 133 communicates with the main passage P1 by connecting the passage forming portion 13 to the first advancing/retreating portion 12. In other words, the passage forming portion 13 forms the third hole 133 therein. That is, the passage forming portion 13 includes third hole 133.

Here, the cross-sectional area of the third hole 133 orthogonal to the central axis is smaller than the passage area of the main passage P1 and smaller than the cross-sectional area of the second hole 113 orthogonal to the central axis.

Summarizing the above, the relationship of the cross-sectional areas is the third hole 133<main passage P1<second hole 113<storage hole 153. It is noted that the cross-sectional areas of the main passage P1 and the second hole 113 may be equal to each other.

In addition, on the outer peripheral surface of the contact portion 131, D-cut portions 134 are provided on the left and right portions in FIG. 3, respectively. The D-cut portion 134 is configured by a flat surface, and has a larger gap between the inner peripheral surface of the storage hole 153 and the D-cut portion 134 than a gap between the inner peripheral surface of the storage hole 153 and the outer peripheral surface of the contact portion 131 other than the D-cut portion 134. In other words, the passage forming portion 13 forms the gap between the inner peripheral surface of the storage hole 153 and the D-cut portion 134.

In addition, on the outer peripheral surface of the contact portion 131, the guide protrusions 130 inserted into the pair of guide holes 154, 155 are provided on the left and right portions in FIGS. 2 and 3, respectively.

Operation of Treatment Tool for Endoscope

Next, the operation of the treatment tool 6 for an endoscope described above will be described. Hereinafter, for convenience of explanation, the flow of ESD will be described as an example.

Figure 4:
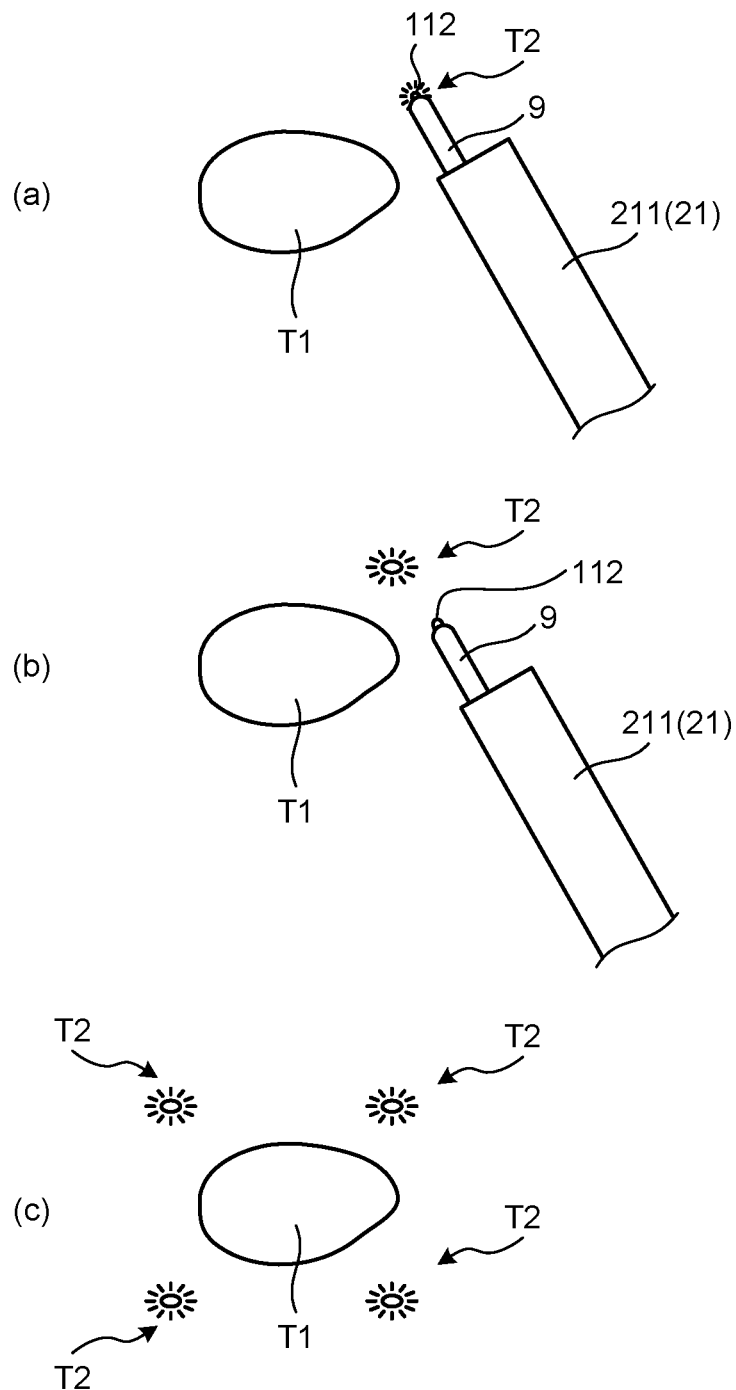
FIG. 4 is a diagram for describing an operation of an endoscope treatment tool.
Figure 5:
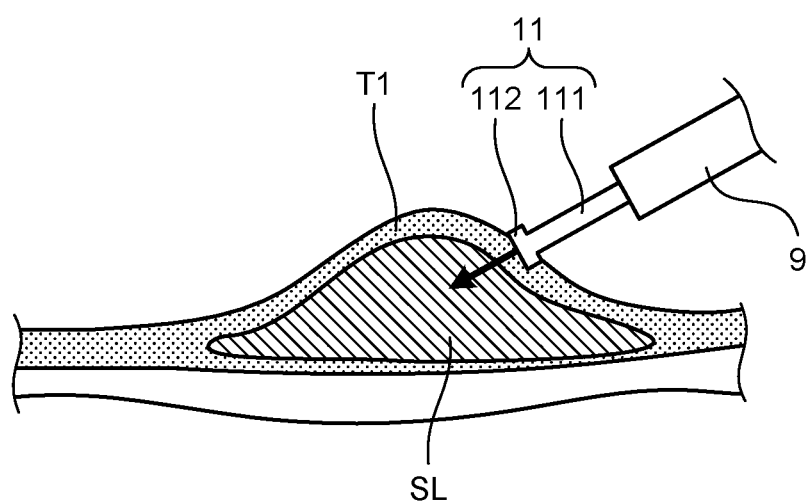
FIG. 5 is a diagram for describing an operation of an endoscope treatment tool.
Figure 6:
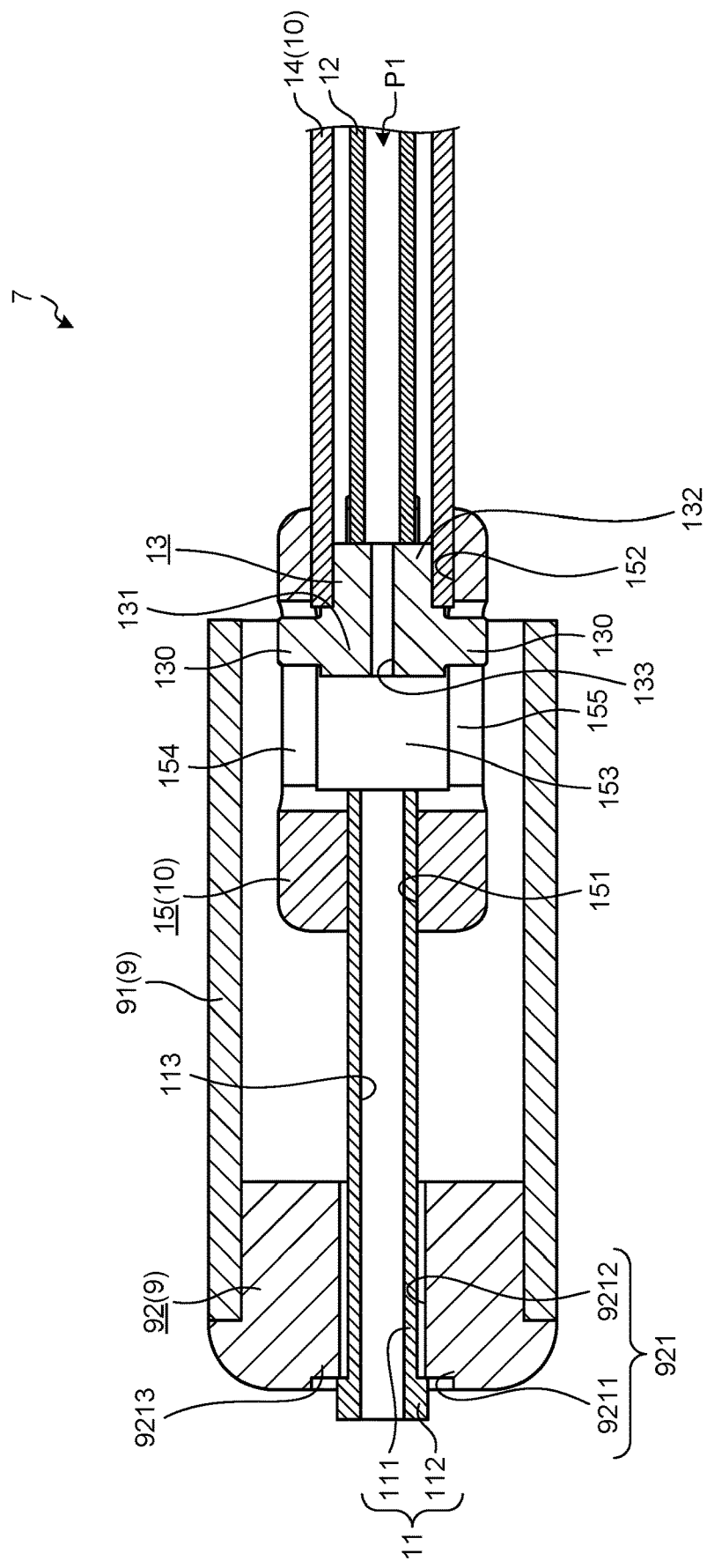
FIG. 6 is a diagram for describing an operation of an endoscope treatment tool.
Figure 7:
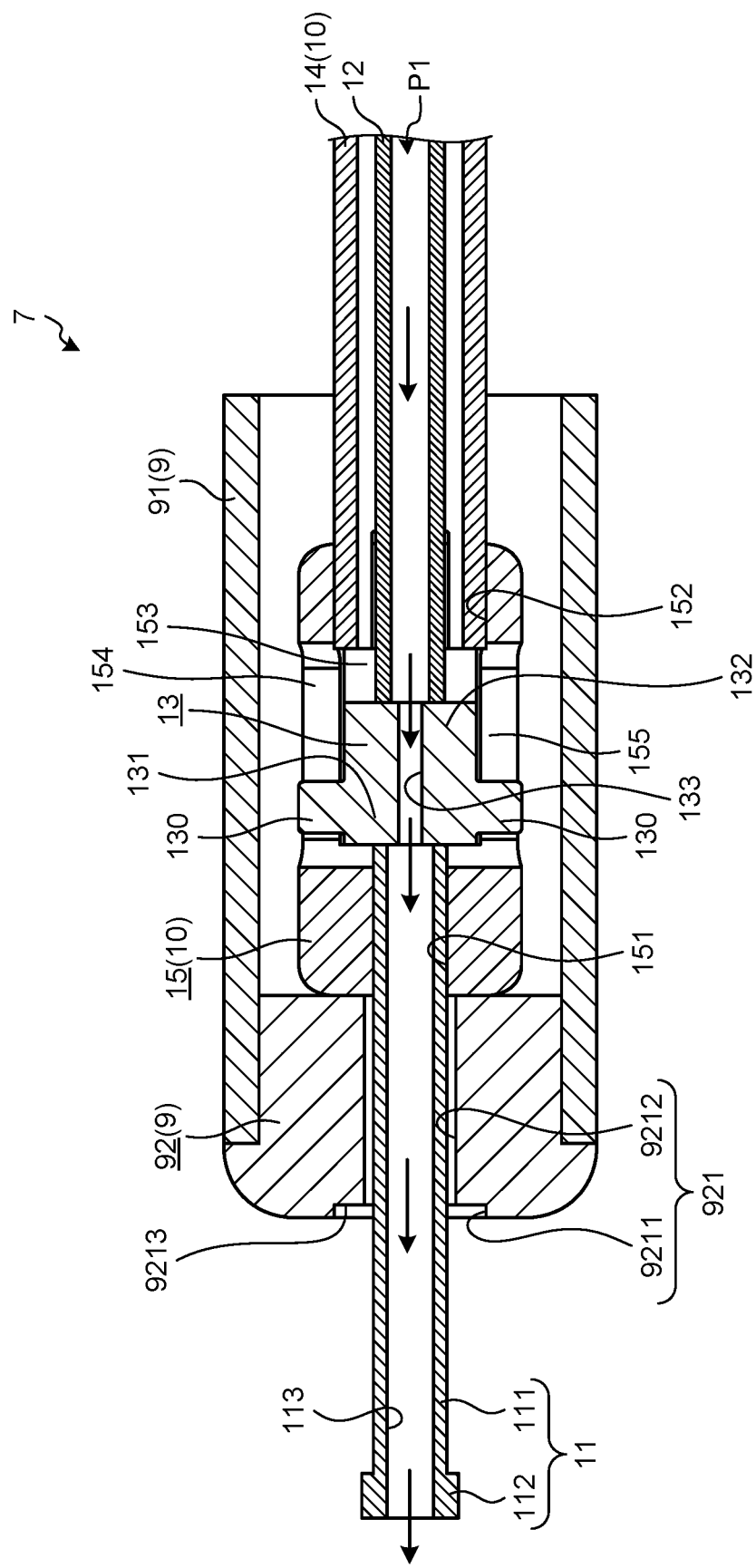
FIG. 7 is a diagram for describing an operation of an endoscope treatment tool.
Figure 8:
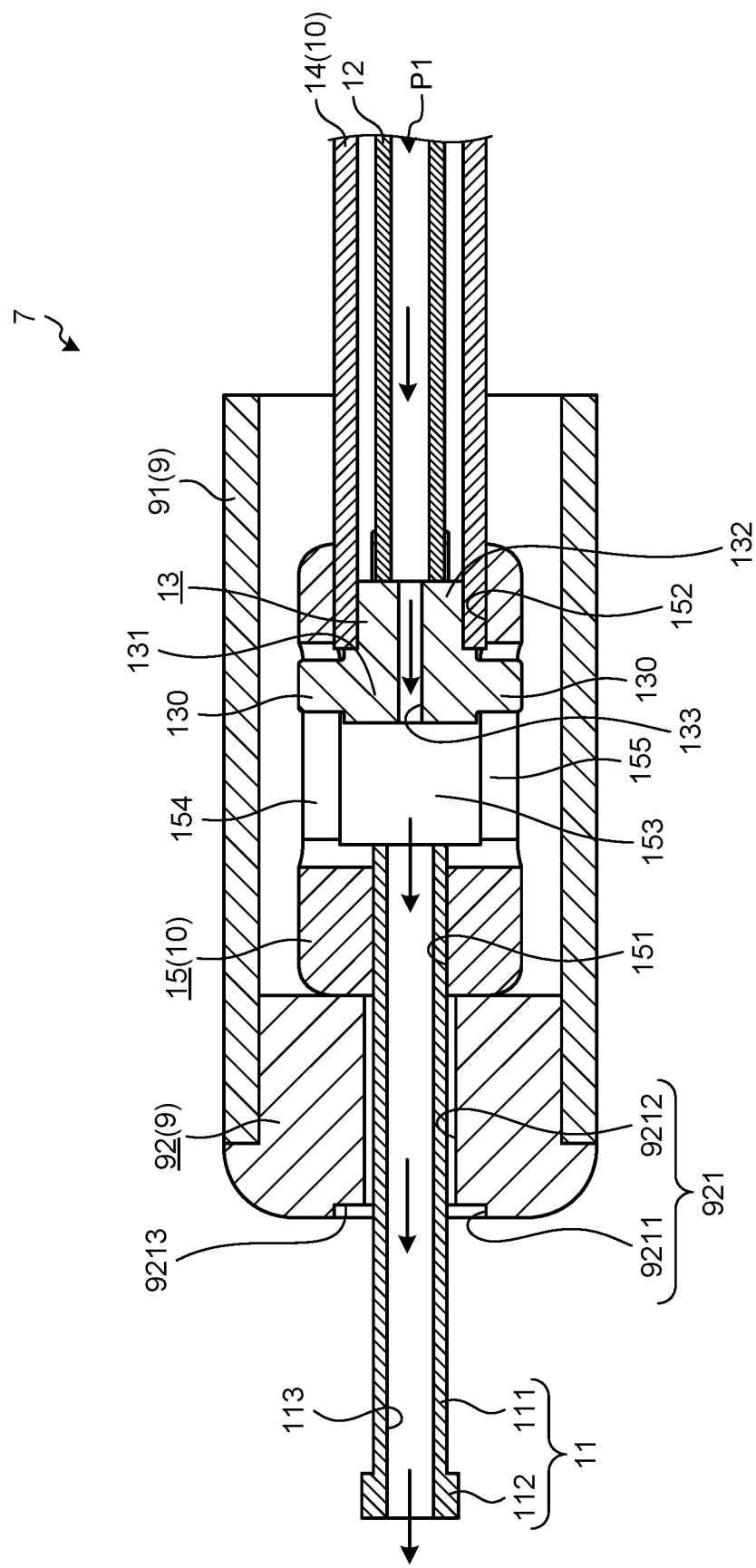
FIG. 8 is a diagram for describing an operation of an endoscope treatment tool.

FIGS. 4 to 8 are diagrams for describing the operation of the treatment tool 6 for an endoscope. Specifically, FIG. 4 is a diagram for describing a marking step in ESD. FIG. 5 is a diagram for describing a local injection step in ESD. FIG. 6 is a cross-sectional view corresponding to FIG. 2 and is a diagram illustrating the treatment tool insertion portion 7 set to a first state. FIG. 7 is a cross-sectional view corresponding to FIG. 2 and is a diagram illustrating the treatment tool insertion portion 7 set to a second state. FIG. 8 is a cross-sectional view corresponding to FIG. 2 and is a diagram illustrating the treatment tool insertion portion 7 set to a third state.

First, an operator such as an operating surgeon inserts the endoscope insertion portion 21 into the body cavity and moves the distal end of the endoscope insertion portion 21 to the vicinity of the target site T1 (FIG. 4).

Next, the operator such as the operating surgeon performs a first retreating operation of pulling the first slider 82 toward the front (ring 811 side). Due to this, the treatment tool insertion portion 7 is in a first state (FIG. 6) where the protrusion portion 112 is located in the large diameter portion 9211, the proximal end of the protrusion portion 112 comes into contact with the first stepped portion 9213, and only the protrusion portion 112 protrudes from the first hole 921 to the outside of the distal end part 92, that is, a state where the protrusion portion 112 protrudes from the first hole 921 and the knife body 111 is located in the first hole 921. An operator such as an operating surgeon inserts the treatment tool insertion portion 7 in the first state from the insertion port 223 into the pipeline inside the endoscope insertion portion 21 and protrudes the treatment tool insertion portion 7 from the distal end of the endoscope insertion portion 21. It is noted that, even when the knife 11 slightly protrudes from the distal end part 92, there is no problem in inserting the treatment tool insertion portion 7 in the first state from the insertion port 223 into the pipeline inside the endoscope insertion portion 21.

Next, the operator such as the operating surgeon performs a marking step as shown below.

That is, the operator such as the operating surgeon operates the operating portion (not illustrated) such as a foot switch while maintaining the first state of the treatment tool insertion portion 7, and energizes the knife 11 with a high frequency current from the power source 100. As illustrated in (a) of FIG. 4, the operator such as the operating surgeon presses the protrusion portion 112 against a living tissue around the target site T1. Due to this, the living tissue coming into contact with the protrusion portion 112 is cauterized. That is, as illustrated in (a) of FIG. 4 or (b) of FIG. 4, a marking sign T2 is formed on the cauterized portion.

The operator such as the operating surgeon repeats the above-described operation a plurality of times to form a number of marking signs T2 so that the outer edge of the target site T1 can be grasped, as illustrated in (c) of FIG. 4. After that, the operator such as the operating surgeon ends the energization of the knife 11 with the high frequency current from the power source 100.

Next, the operator such as the operating surgeon performs a first advancing operation of pushing the first slider 82. Due to this, the treatment tool insertion portion 7 is in a state (second state) where the distal end of the connecting portion 15 comes into contact with the proximal end of the distal end part 92 and the knife 11 protrudes from the distal end of the sheath 9 by the maximum protrusion length. Next, the operator such as the operating surgeon performs a second advancing operation of pushing the second slider 83. Due to this, the treatment tool insertion portion 7 is in a state where the passage forming portion 13 moved to a first position and abuts on the proximal end of the knife 11. That is, in the first embodiment, the distal end of the contact portion 131 comes into contact with the proximal end of the knife 11 at the first position. The passage forming portion 13 covers a portion of the opening on the proximal end side in the second hole 113 (a portion of the opening on the proximal end side in the first fitting hole 151) by a portion other than the third hole 133. At this time, the center of the opening on the distal end side in the third hole 133 is located coaxially with the center of the opening on the proximal end side in the second hole 113, but it is not necessarily located coaxially.

It is noted that the knife 11 may be attached to the connecting portion 15 so that the proximal end of the knife 11 is located inside the first fitting hole 151. In that case, the passage forming portion 13 may adopt a configuration in which the passage forming portion 13 comes into contact with the peripheral edge portion of the first fitting hole 151 in the connecting portion 15, without coming into contact with the proximal end of the knife 11. That is, the passage forming portion 13 does not necessarily come into contact with the base end of the knife 11 at the first position of the passage forming portion 13. When coming into contact with the peripheral edge portion of the first fitting hole 151 in the connecting portion 15, the first fitting hole 151 of the connecting portion 15 may be located between the proximal end of the knife 11 and the passage forming portion 13. In this state, the passage forming portion 13 covers a portion of the opening on the proximal end side in the first fitting hole 151 by a portion other than the third hole 133.

As described above, the treatment tool insertion portion 7 is in the second state illustrated in FIG. 7 by the first and second advancing operations on the first and second sliders 82 and 83.

That is, the operator such as the operating surgeon operates the operating portion (not illustrated) such as a foot switch while maintaining the second state of the treatment tool insertion portion 7 by the first and second advancing operations on the first and second sliders 82 and 83, and supplies the physiological saline solution from the water supply source 200. Due to this, as indicated by the arrow in FIG. 7, the physiological saline solution supplied from the water supply source 200 is discharged from the distal end of the knife 11 after following the passage from the main passage P1 through the third hole 133 and the second hole 113. Here, the cross-sectional area of the third hole 133 orthogonal to the central axis is smaller than the passage area of the main passage P1. That is, the physiological saline solution flows into the second hole 113 after the passage is narrowed down at one end by passing through the inside of the third hole 133. Therefore, the physiological saline solution SL discharged from the distal end of the knife 11 has a relatively high water pressure and is injected below the target site T1 by the water pressure (FIG. 5). The target site T1 floats from other tissues such as the lower submucosal layer.

Next, the operator such as the operating surgeon performs an incision step as shown below.

That is, the operator such as the operating surgeon performs a first advancing operation on the first slider 82. When the first advancing operation is performed on the first slider 82, as described above, the treatment tool insertion portion 7 is in a state where the knife 11 protrudes from the sheath 9 by the maximum protrusion length.

In addition, the operator such as the operating surgeon operates the operating portion (not illustrated) such as a foot switch while maintaining a state in which the knife 11 protrudes from the sheath 9 by the maximum protrusion length by the first advancing operation on the first slider 82, and energizes the knife 11 with a high frequency current from the power source 100. The operator such as the operating surgeon moves the protrusion portion 112 along the periphery of the target site T1 in a state where the living tissue is pierced while confirming the marking sign T2, and incises the entire periphery of the target site T1. After that, while maintaining the third state, the target site T1 is removed by performing dissection or the like on the submucosal layer including the target site T1, the entire periphery of which is incised.

ESD is completed by the above steps. It is noted that, in each step of ESD described above, when cleaning the surgical site, the operator such as the operating surgeon performs the following operations.

The operator such as the operating surgeon performs a second retreating operation of pulling the second slider 83 toward the front (ring 811 side). Due to this, the treatment tool insertion portion 7 is in a state where the passage forming portion 13 is located at a second position that is farther from the proximal end of the knife 11 than the first position. Specifically, at the second position, it becomes a state where the proximal end portion 132 enters the second advancing/retreating portion body 14 and the proximal end of the contact portion 131 comes into contact with the distal end of the second advancing/retreating portion body 14. That is, the storage hole 153 is located between the second hole 113 and the third hole 133, and the treatment tool insertion portion 7 is in the third state illustrated in FIG. 8. It is noted that, at the second position, a gap between the proximal end portion 132 and the second advancing/retreating portion body 14 is slightly opened and communicates with a gap between the first advancing/retreating portion 12 and the second advancing/retreating portion body 14.

In addition, the operator such as the operating surgeon operates the operating portion (not illustrated) such as a foot switch while maintaining the third state of the treatment tool insertion portion 7 by the second retreating operation on the second slider 83, and supplies the physiological saline solution from the water supply source 200. Due to this, as indicated by the arrow in FIG. 8, the physiological saline solution supplied from the water supply source 200 is discharged from the distal end of the knife 11 after following the passage from the main passage P1 through the third hole 133, the storage hole 153, and the second hole 113. Here, the cross-sectional area of the storage hole 153 orthogonal to the central axis is larger than the passage area of the main passage P1 and the cross-sectional area of the third hole 133 orthogonal to the central axis. That is, the physiological saline solution flows into the second hole 113 after the passage is expanded at one end by passing through the inside of the storage hole 153. At this time, the physiological saline solution flows into the storage hole 153 from the gap between the first advancing/retreating portion 12 and the second advancing/retreating portion body 14, and is stored in the storage hole 153. Therefore, even when water is supplied from the third hole 133, the water is not discharged from the distal end of the knife 11 through the second hole 113 with the same water pressure. Therefore, the water pressure of the physiological saline solution discharged from the distal end of the knife 11 becomes relatively low. That is, local injection is not performed by the physiological saline solution discharged from the distal end of the knife 11, and the physiological saline solution is supplied to the surgical site to clean the surgical site.

As described above, the passage cross-sectional area ratio of the second hole 113 to the third hole 133 is smaller than the passage cross-sectional area ratio of the storage hole 153 to the third hole 133. By utilizing the relationship of the passage cross-sectional area ratio, the water pressure of the physiological saline solution discharged from the distal end of the knife 11 is adjusted.

It is noted that, in FIG. 6 that illustrates the first state of the treatment tool insertion portion 7 described above in the marking step, it is assumed that the operator such as the operating surgeon performs the second retreating operation on the second slider 83, but the disclosure is not limited thereto. The first state may be a state where the second advancing operation has been performed on the second slider 83.

In addition, in FIG. 8 that illustrates the third state of the treatment tool insertion portion 7 described above in the surgical site cleaning process, it is assumed that the operator such as the operating surgeon performs the first advancing operation on the first slider 82, but the disclosure is not limited thereto. The third state may be a state where the first retreating operation has been performed on the first slider 82.

According to the first embodiment described above, the following effects are obtained.

In the treatment tool 6 for an endoscope according to the first embodiment, the treatment tool insertion portion 7 includes the passage forming portion 13 described above. A portion of the opening on the proximal end side in the second hole 113 of the knife 11 is covered with a portion of the passage forming portion 13 other than the third hole 133 when the passage forming portion 13 is located at the first position. That is, by locating the passage forming portion 13 at the first position, the water pressure of the physiological saline solution discharged from the distal end of the knife 11 can be set to be high. On the other hand, by locating the passage forming portion 13 at the second position, the water pressure of the physiological saline solution discharged from the distal end of the knife 11 can be set to be low.

Therefore, in the treatment tool 6 for an endoscope according to the first embodiment, the water pressure of the physiological saline solution discharged from the distal end of the knife 11 can be adjusted with a simple configuration that allows the passage forming portion 13 to move between the first position and the second position.

In particular, in the treatment tool 6 for an endoscope according to the first embodiment, in ESD, the local injection step and other steps can be performed by the single treatment tool 6 for an endoscope, without changing the treatment tool between the local injection step and other steps. Therefore, convenience can be improved.

In addition, in the treatment tool 6 for an endoscope according to the first embodiment, the first advancing/retreating portion 12 and the passage forming portion 13 are disposed in the second advancing/retreating portion 10. Therefore, the first advancing/retreating portion 12, the second advancing/retreating portion 10, and the passage forming portion 13 can be compactly assembled and the diameter of the treatment tool insertion portion 7 can be reduced. It is noted that, since the first advancing/retreating portion 12 and the second advancing/retreating portion 10 can be independently operated to be able to advance and retreat, only the water pressure can be adjusted according to the purpose such as local injection or cleaning while the knife 11 is positioned.

Second Embodiment

Next, the second embodiment will be described.

In the following description, the same reference numerals are assigned to the same components as those in the first embodiment described above and detailed description thereof will be omitted or simplified.

The treatment tool 6 for an endoscope according to the second embodiment differs from the treatment tool 6 for an endoscope described above in the first embodiment in the configuration of the distal end portion of the treatment tool insertion portion 7. Hereinafter, for convenience of explanation, the treatment tool insertion portion according to the second embodiment is referred to as a treatment tool insertion portion 7A.

Figure 9:
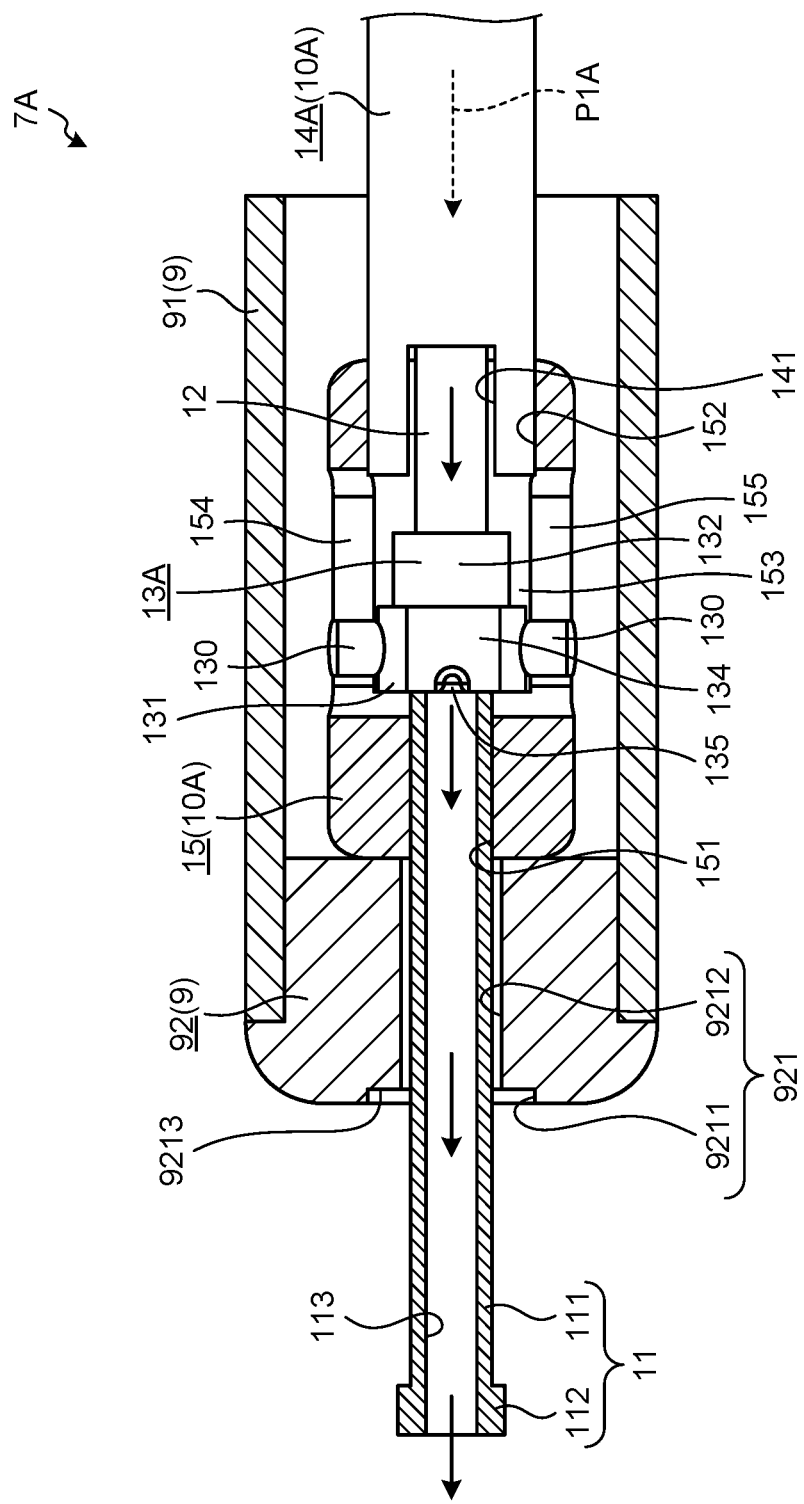
FIG. 9 is a diagram for describing a configuration of a treatment tool insertion portion according to a second embodiment.
Figure 10:
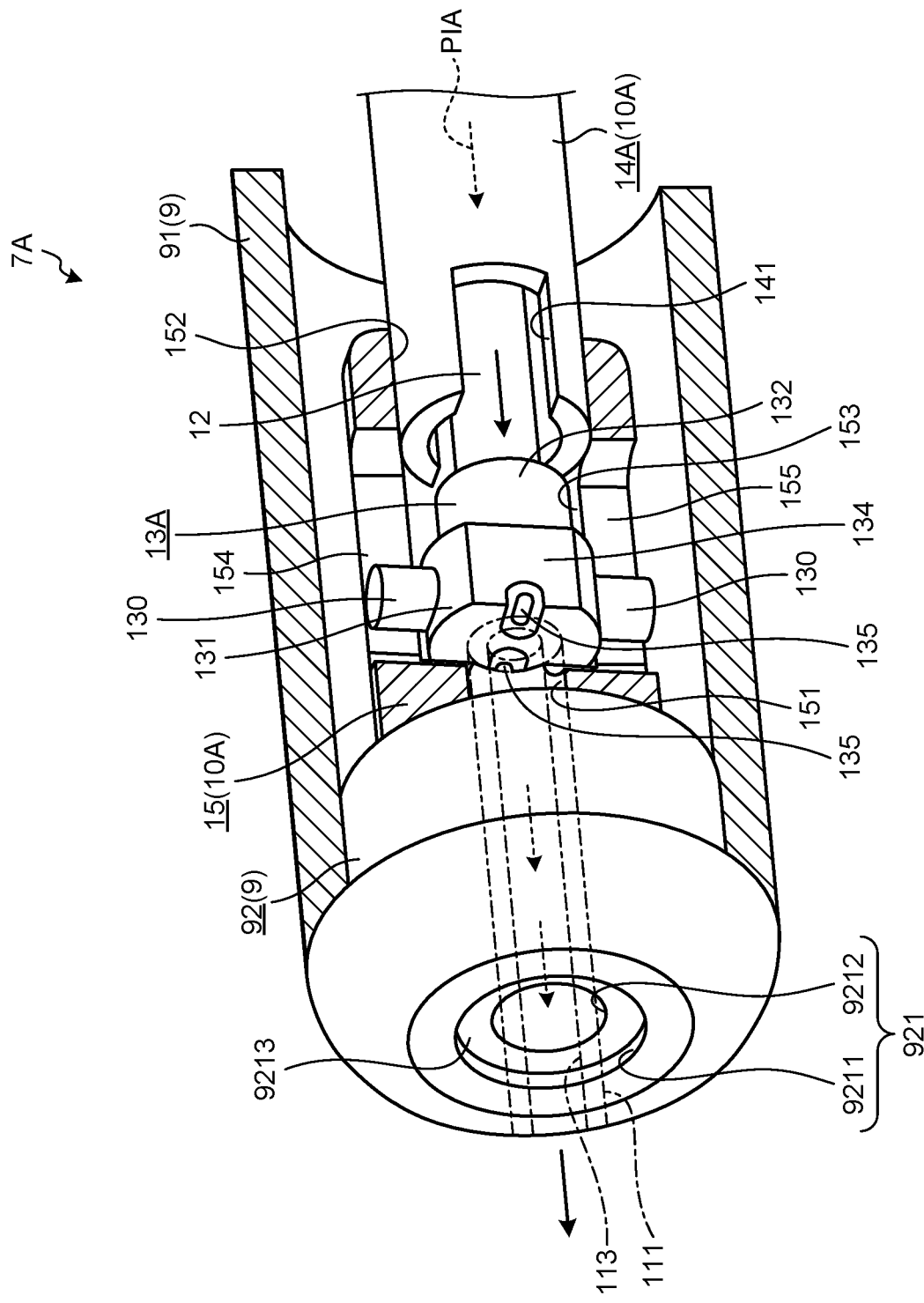
FIG. 10 is a diagram for describing a configuration of a treatment tool insertion portion according to the second embodiment.
Figure 11:
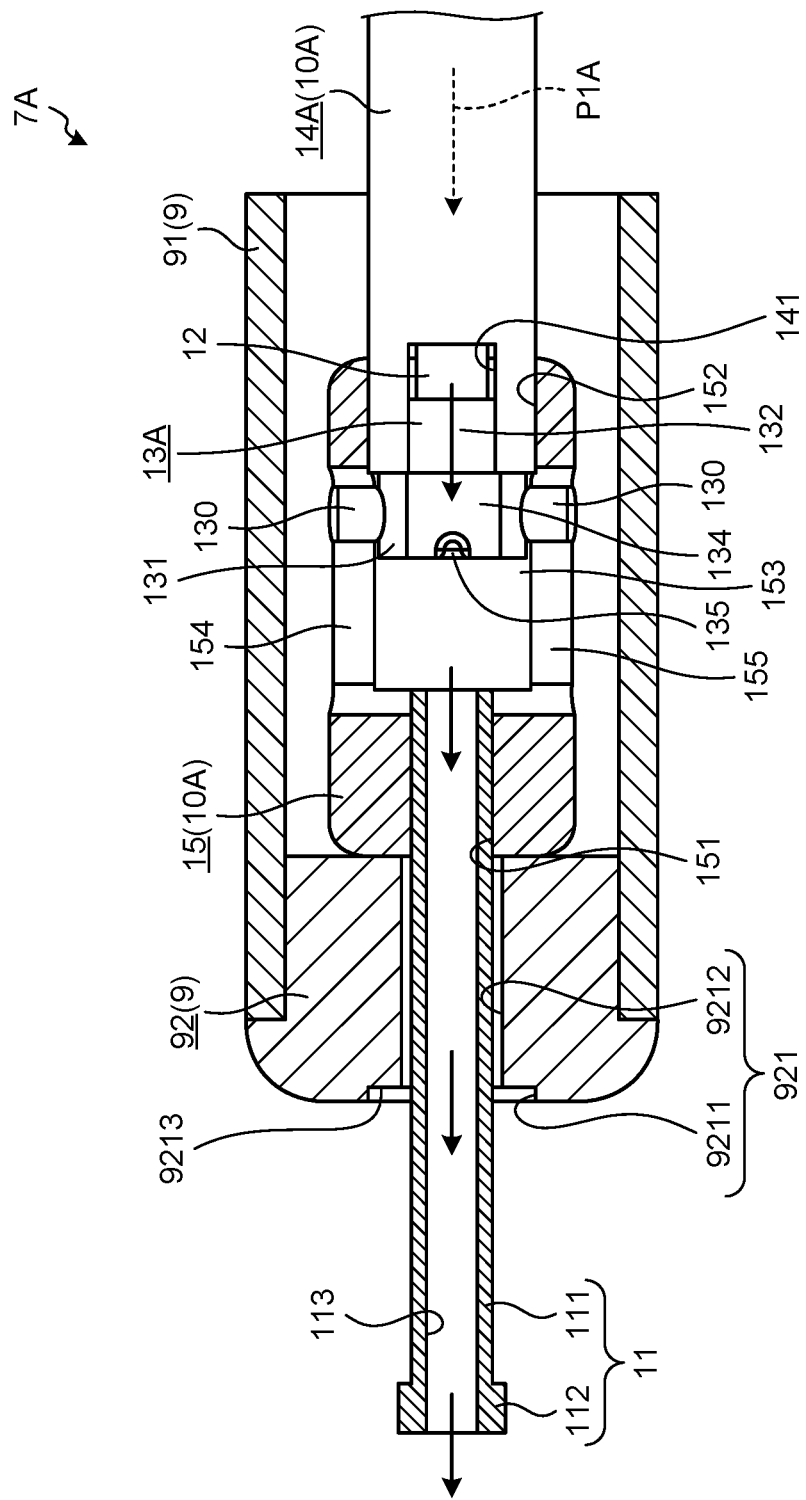
FIG. 11 is a diagram for describing a configuration of a treatment tool insertion portion according to the second embodiment.
Figure 12:
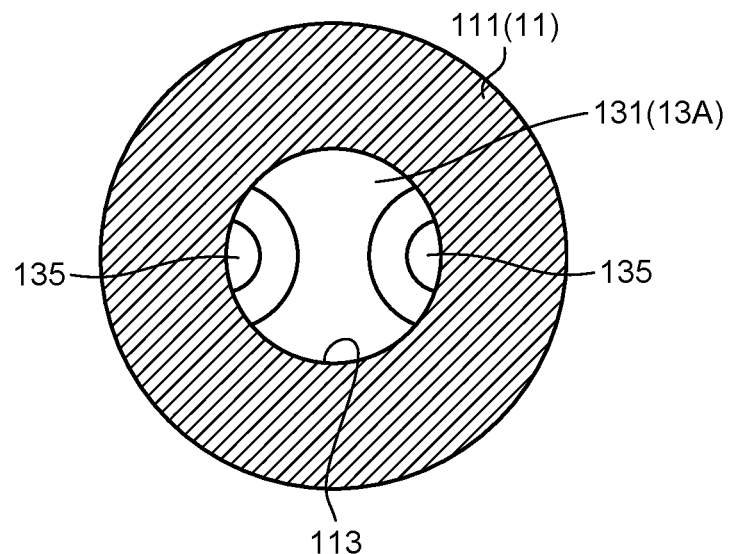
FIG. 12 is a diagram for describing a configuration of a treatment tool insertion portion according to the second embodiment.

FIGS. 9 to 12 are diagrams for describing the configuration of the treatment tool insertion portion 7A according to the second embodiment. Specifically, FIG. 9 is a cross-sectional view corresponding to FIG. 7 and is a diagram illustrating the treatment tool insertion portion 7A set to a second state. FIG. 10 is a diagram illustrating the inside of the sheath 9 at the distal end portion of the treatment tool insertion portion 7A set to the second state. It is noted that, in FIG. 10, only the sheath body 91 and the connecting portion 15 in the distal end portion of the treatment tool insertion portion 7A are cut. In addition, in FIG. 10, for convenience of explanation, the knife 11 is illustrated by an alternate long and short dash line. FIG. 11 is a cross-sectional view corresponding to FIG. 8 and is a diagram illustrating the treatment tool insertion portion 7A set to a third state. Specifically FIG. 12 is a diagram, when viewed from the distal end side, illustrating a cross-section obtained when the distal end portion of the treatment tool insertion portion 7A is cut at the position passing through the knife 11 by a plane orthogonal to the central axis of the treatment tool insertion portion 7A. It is noted that, in FIG. 12, for convenience of explanation, the illustration of the sheath 9 and the connecting portion 15 is omitted.

As illustrated in FIGS. 9 to 11, the treatment tool insertion portion 7A differs from the treatment tool insertion portion 7 described above in the first embodiment in the shapes of the second advancing/retreating portion 10 and the passage forming portion 13. Hereinafter, for convenience of explanation, a second advancing/retreating portion and a passage forming portion according to the second embodiment are referred to as a second advancing/retreating portion 10A and a passage forming portion 13A, respectively.

As illustrated in FIGS. 9 to 11, the second advancing/retreating portion 10A differs from the second advancing/retreating portion 10 described above in the first embodiment in the shape of the second advancing/retreating portion body 14. Hereinafter, for convenience of explanation, the second advancing/retreating portion body according to the second embodiment is referred to as a second advancing/retreating portion body 14A.

In the second embodiment, the water supply port 812 communicates with not the first advancing/retreating portion 12 but the second advancing/retreating portion body 14A. A space between the inner peripheral surface of the second advancing/retreating portion body 14A and the outer peripheral surface of the first advancing/retreating portion 12 functions as a main passage P1A (FIGS. 9 to 11), through which the physiological saline solution supplied from the water supply source 200 flows via the tube TU and the water supply port 812.

In addition, as illustrated in FIGS. 9 to 11, a first notch portion 141 is provided at the distal end portion of the second advancing/retreating portion body 14A.

The first notch portion 141 corresponds to a communication hole, which is notched from the distal end of the second advancing/retreating portion body 14A toward the proximal end side and communicates the main passage P1A with the storage hole 153. The communication hole may correspond to a communication channel.

It is noted that the outer peripheral surface of the second advancing/retreating portion 10A described above is covered with an inner tube (not illustrated) as in the first embodiment described above.

In the passage forming portion 13A, the third hole 133 is not provided in the passage forming portion 13A described above in the first embodiment. In addition, as illustrated in FIGS. 9 to 11, a second notch portion 135 is provided in the passage forming portion 13A, and a passage is formed by the second notch portion 135. In other words, the passage forming portion 13 forms the second notch portion 135 therein. That is, the passage forming portion 13 includes the second notch portion 135.

The outer peripheral surface of the passage forming portion 13A includes a pair of D-cut portions 134 formed from the distal end to the proximal end, and a flat surface is formed. It is noted that the surface does not necessarily have to be a flat surface, and may be a concave surface extending in a concave shape along a longitudinal axis. In addition, the outer peripheral surface of the cross-section of the passage forming portion 13A may be an ellipse or an oval. Even when the outer peripheral surface of the cross-section of the passage forming portion 13A has a perfect circular shape, the outer diameter may be to the extent that a gap is formed between the passage forming portion 13A and a connecting portion 15A. With this structure, a passage is defined by a gap formed between the outer peripheral surface of the passage forming portion 13A and the inner peripheral surface of the connecting portion 15.

The second notch portion 135 is a groove formed from the pair of D-cut portions 134 to the distal end surface of the contact portion 131 along the surface of the contact portion 131.

It is noted that the operation of the treatment tool 6 for an endoscope according to the second embodiment differs from the first embodiment described above only in the passage of the physiological saline solution in the treatment tool insertion portion 7A (see the arrows illustrated in FIGS. 9 and 11).

Specifically, in the local injection step, when the operator such as the operating surgeon performs the first and second advancing operations on the first and second sliders 82 and 83, the treatment tool insertion portion 7A is in a second state (FIG. 9) where the passage forming portion 13A is located at the first position. At the first position, as illustrated in FIG. 12, a portion of the second notch portion 135 is located in the second hole 113 when viewed along the central axis of the second hole 113. That is, the passage forming portion 13A covers a portion of the opening on the proximal end side in the second hole 113 by a portion other than the second notch portion 135. As indicated by the arrows in FIG. 9, the physiological saline solution supplied from the water supply source 200 passes from the main passage P1A through the storage hole 153, the D-cut portion 134, and the second notch portion 135, via the first notch portion 141, follows the passage of the second hole 113 from the second notch portion 135, and is then discharged from the distal end of the knife 11.

Specifically, in the surgical site cleaning, when the operator such as the operating surgeon performs the second retreating operations on the second slider 83, the treatment tool insertion portion 7A is in a third state (FIG. 11) where the passage forming portion 13A is located at the second position. As indicated by the arrows in FIG. 11, the physiological saline solution supplied from the water supply source 200 passes from the main passage P1A through the D-cut portion 134, the second notch portion 135, and the storage hole 153 via the first notch portion 141, follows the passage of the second hole 113 from the storage hole 153, and is then discharged from the distal end of the knife 11.

Here, the passage cross-sectional area ratio of the second hole 113 to the gap (passage) between the passage forming portion 13A and the inner peripheral surface of the connecting portion 15 is smaller than the passage cross-sectional area ratio of the storage hole 153 to the gap (passage) between the passage forming portion 13A and the inner peripheral surface of the connecting portion 15. Therefore, the water pressure of the physiological saline solution discharged from the distal end of the knife 11 in the local injection step is higher than the water pressure of the physiological saline solution discharged from the distal end of the knife 11 in the surgical site cleaning.

Even when the treatment tool insertion portion 7A according to the second embodiment described above is adopted, the same effects as those of the first embodiment described above can be obtained.

Third Embodiment

Next, the third embodiment will be described.

In the following description, the same reference numerals are assigned to the same components as those in the second embodiment described above and detailed description thereof will be omitted or simplified.

The treatment tool 6 for an endoscope according to the third embodiment differs from the treatment tool 6 for an endoscope described above in the second embodiment in the configuration of the distal end portion of the treatment tool insertion portion 7A. Hereinafter, for convenience of explanation, the treatment tool insertion portion according to the third embodiment is referred to as a treatment tool insertion portion 7B.

Figure 13:
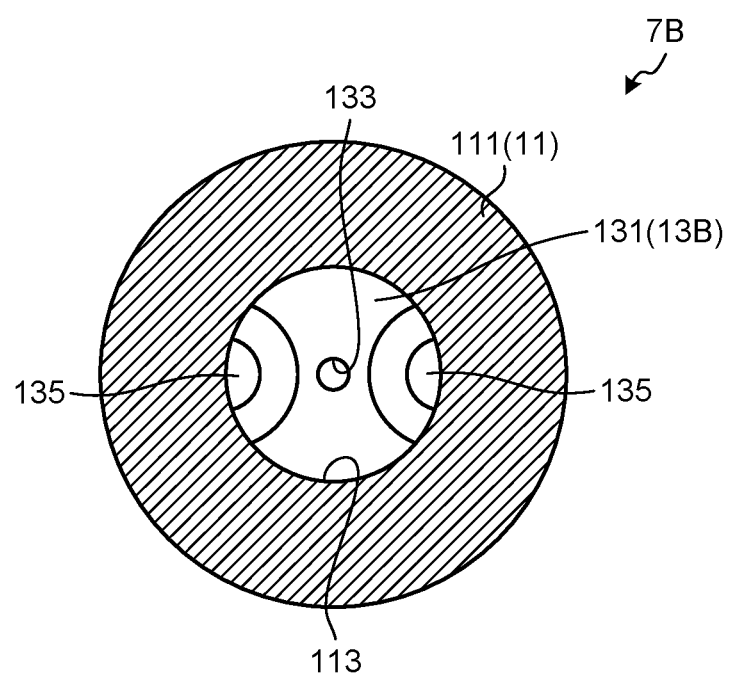
FIG. 13 is a diagram for describing a configuration of a treatment tool insertion portion according to a third embodiment.

FIG. 13 is a diagram for describing the configuration of the treatment tool insertion portion 7B according to the third embodiment. Specifically, FIG. 13 is a diagram corresponding to FIG. 12.

As illustrated in FIG. 13, the treatment tool insertion portion 7B differs from the treatment tool insertion portion 7A described above in the second embodiment in the shapes of the passage forming portion 13. Hereinafter, for convenience of explanation, the passage forming portion according to the third embodiment is referred to as a passage forming portion 13B.

In the passage forming portion 13B, as illustrated in FIG. 13, the third hole 133 described above in the first embodiment is provided to the treatment tool insertion portion 7A described above in the second embodiment.

In the third embodiment, the water supply port 812 communicates with both the inside of the first advancing/retreating portion 12 and the inside of the second advancing/retreating portion body 14A. That is, the inside of the first advancing/retreating portion 12 and the space between the inner peripheral surface of the second advancing/retreating portion body 14A and the outer peripheral surface of the first advancing/retreating portion 12 function as the main passage, through which the physiological saline solution supplied from the water supply source 200 flows via the tube TU and the water supply port 812. The main passage is a combination of the main passage P1 described above in the first embodiment and the main passage P1A described above in the second embodiment.

It is noted that the operation of the treatment tool 6 for an endoscope according to the third embodiment differs from the first and second embodiments described above only in the passage of the physiological saline solution in the treatment tool insertion portion 7B.

Specifically, in the third embodiment, the passage of the physiological saline solution in the treatment tool insertion portion 7B is a combination of the passage described above in the first embodiment and the passage described above in the second embodiment.

Even when the treatment tool insertion portion 7B according to the third embodiment described above is adopted, the same effects as those of the first and second embodiments described above can be obtained.

Fourth Embodiment

Next, the fourth embodiment will be described.

In the following description, the same reference numerals are assigned to the same components as those in the first embodiment described above and detailed description thereof will be omitted or simplified.

The treatment tool 6 for an endoscope according to the fourth embodiment differs from the treatment tool 6 for an endoscope described above in the first embodiment in the configuration of the distal end portion of the treatment tool insertion portion 7. Hereinafter, for convenience of explanation, the treatment tool insertion portion according to the fourth embodiment is referred to as a treatment tool insertion portion 7C.

Figure 14:
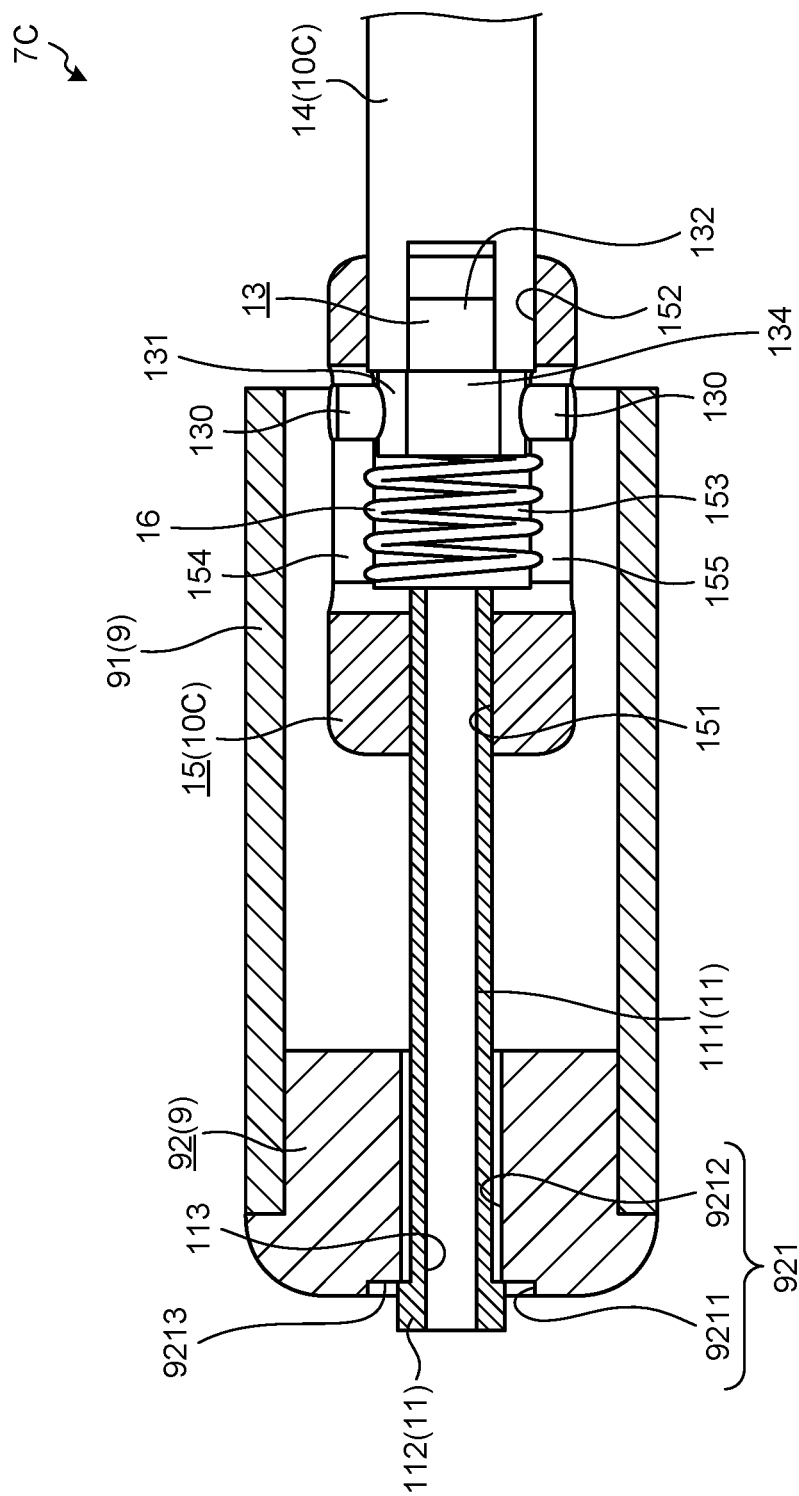
FIG. 14 is a diagram for describing a configuration of a treatment tool insertion portion according to a fourth embodiment.
Figure 15:
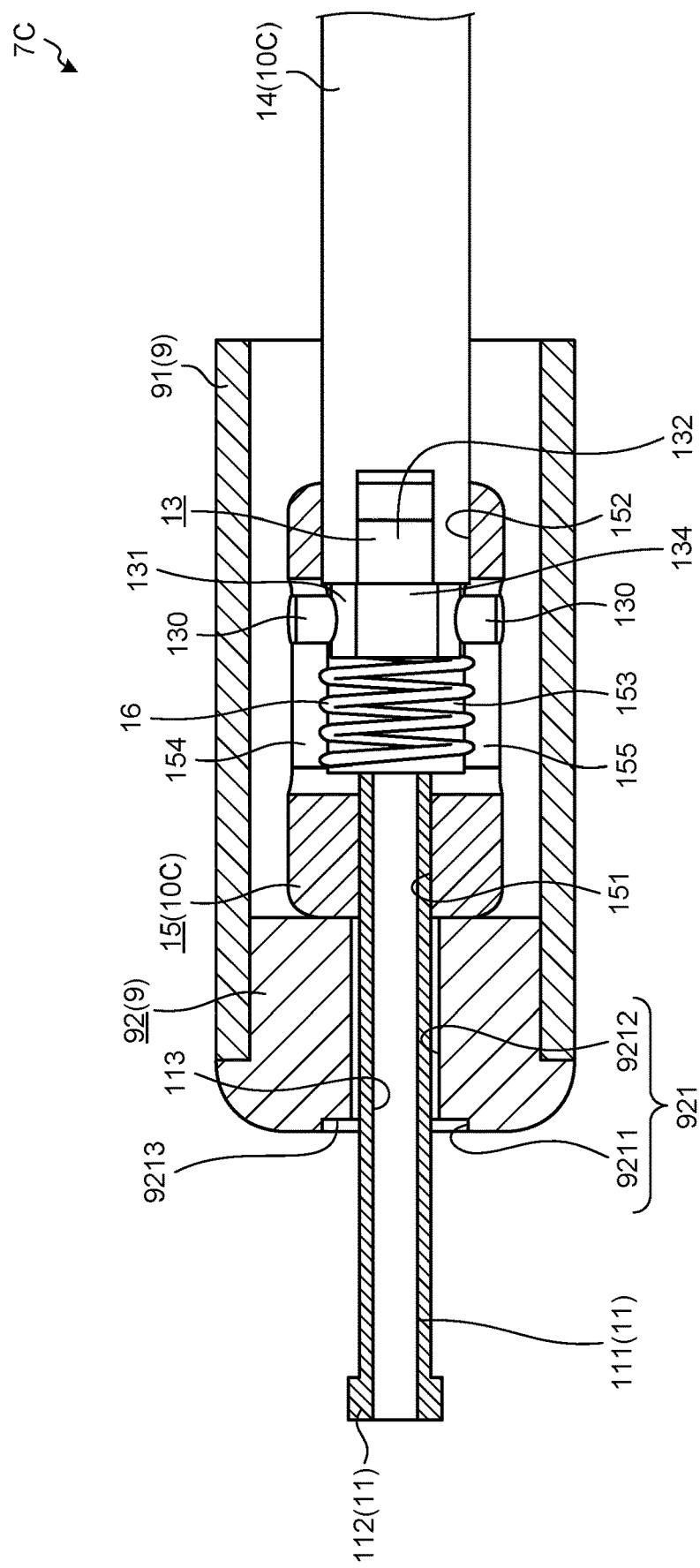
FIG. 15 is a diagram for describing a configuration of a treatment tool insertion portion according to the fourth embodiment.
Figure 16:
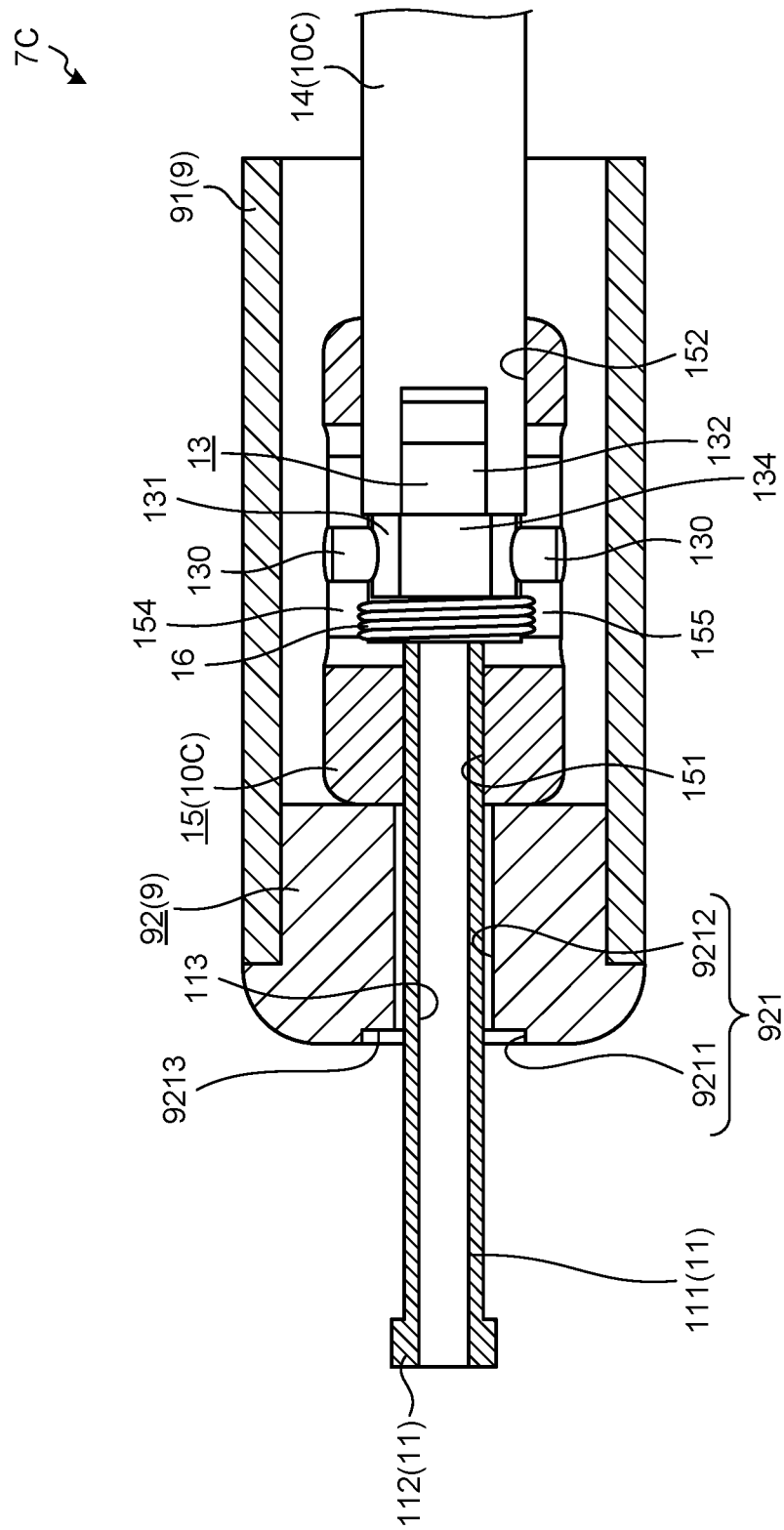
FIG. 16 is a diagram for describing a configuration of a treatment tool insertion portion according to the fourth embodiment.

FIGS. 14 to 16 are diagrams for describing the configuration of the treatment tool insertion portion 7C according to the fourth embodiment. Specifically, FIG. 14 is a cross-sectional view corresponding to FIG. 2 and is a diagram illustrating the treatment tool insertion portion 7C set to a fourth state. FIG. 15 is a cross-sectional view corresponding to FIG. 2 and is a diagram illustrating the treatment tool insertion portion 7C set to a fifth state. FIG. 16 is a cross-sectional view corresponding to FIG. 2 and is a diagram illustrating the treatment tool insertion portion 7C set to a sixth state.

In the treatment tool insertion portion 7C, as illustrated in FIGS. 14 to 16, the first advancing/retreating portion 12 is omitted with respect to the treatment tool insertion portion 7 described above in the first embodiment. In the fourth embodiment, although the specific illustration is omitted, the second slider 83 is also omitted as the first advancing/retreating portion 12 is omitted. In addition, as the first advancing/retreating portion 12 is omitted, the main passage becomes the inside of the second advancing/retreating portion body 14.

In addition, the treatment tool insertion portion 7C differs from the treatment tool insertion portion 7 described above in the first embodiment in the second advancing/retreating portion 10. Hereinafter, for convenience of explanation, the second advancing/retreating portion according to the fourth embodiment is referred to as a second advancing/retreating portion 10C.

The second advancing/retreating portion 10C differs from the second advancing/retreating portion 10 described above in the first embodiment in the relationship between the second advancing/retreating portion body 14 and the connecting portion 15.

Specifically, in the fourth embodiment, the second advancing/retreating portion body 14 is configured to be able to advance and retreat in the second fitting hole 152 and the storage hole 153 along the central axis of the connecting portion 15. In addition, the proximal end of the contact portion 131 comes into contact with the distal end of the second advancing/retreating portion body 14, and the passage forming portion 13 is fixed in a state where the proximal end portion 132 is inserted into the second advancing/retreating portion body 14. That is, the passage forming portion 13 advances and retreats in the storage hole 153 together with the second advancing/retreating portion body 14 according to the operation on the first slider 82 by the operator such as the operating surgeon.

It is noted that the outer peripheral surface of the second advancing/retreating portion 10C described above is covered with an inner tube (not illustrated) as in the first embodiment described above.

Furthermore, in the treatment tool insertion portion 7C, as illustrated in FIGS. 14 to 16, an urging member 16 is disposed in the storage hole 153.

In the fourth embodiment, as illustrated in FIGS. 14 to 16, the urging member 16 is configured by a coil spring. One end of the urging member 16 is in contact with or fixed to the distal end of the contact portion 131, and the other end of the urging member 16 is in contact with or fixed to the peripheral edge portion of the first fitting hole 151 in the connecting portion 15. The urging member 16 urges the passage forming portion 13 toward the second position.

It is noted that the operation of the treatment tool 6 for an endoscope according to the fourth embodiment differs from the first embodiment described above only in the operation on the treatment tool operating portion 8 by the operator such as the operating surgeon.

Specifically, in the marking step, the operator such as the operating surgeon performs a first retreating operation on the first slider 82. Due to this, the knife 11 is pulled toward the proximal end side by the second advancing/retreating portion body 14, the passage forming portion 13, and the connecting portion 15. The treatment tool insertion portion 7C is in a state where the protrusion portion 112 is located inside the large diameter portion 9211, the proximal end of the protrusion portion 112 comes into contact with the first stepped portion 9213, and only the protrusion portion 112 protrudes from the first hole 921 to the outside of the distal end part 92. In addition, the passage forming portion 13 moves toward the proximal end side together with the second advancing/retreating portion body 14 in the storage hole 153, and is located at a second position away from the proximal end of the knife 11.

As described above, the treatment tool insertion portion 7C is in the fourth state illustrated in FIG. 14 by the first retreating operation on the first slider 82. The operator such as the operating surgeon operates the operating portion (not illustrated) such as a foot switch while maintaining the fourth state of the treatment tool insertion portion 7C by the first retreating operation on the first slider 82, and energizes the knife 11 with a high frequency current from the power source 100. After that, the operator such as the operating surgeon forms the marking sign T2 in the same manner as in the first embodiment described above.

In addition, in the local injection step, the operator such as the operating surgeon performs a third protruding operation of pushing the first slider 82.

When the first slider 82 is lightly pushed in the third protruding operation, the treatment tool insertion portion 7C is in the fifth state illustrated in FIG. 15. The fifth state is a state where the distal end of the connecting portion 15 comes into contact with the proximal end of the distal end part 92 and the knife 11 protrudes from the distal end of the sheath 9 by the maximum protrusion length. Here, the passage forming portion 13 maintains the state of being located at the second position by the urging force of the urging member 16.

In addition, when the first slider 82 is strongly pushed in the third protruding operation, the treatment tool insertion portion 7C changes from the fifth state illustrated in FIG. 15 to the sixth state illustrated in FIG. 16. In the sixth state, the passage forming portion 13 moves toward the distal end side in the storage hole 153 against the urging force of the urging member 16 together with the second advancing/retreating portion body 14 and is in a state of being located at the first position close to the proximal end of the knife 11. In the fourth embodiment, the distal end of the contact portion 131 comes into contact with the proximal end of the knife 11 at the first position. The passage forming portion 13 covers a portion of the opening on the proximal end side in the second hole 113 by a portion other than the third hole 133. In the sixth state, the passage is in communication with the second hole 113 via the urging member 16 in the first position. In this embodiment, the passage may be formed by the gap. The gap is formed between the storage hole 153 and the passage forming portion 13.

The operator such as the operating surgeon operates the operating portion (not illustrated) such as a foot switch while maintaining the sixth state of the treatment tool insertion portion 7C by a third protruding operation on the first slider 82, and supplies the physiological saline solution from the water supply source 200. Due to this, the physiological saline solution is discharged from the distal end of the knife 11, and the physiological saline solution is injected below the target site T1 in the same manner as in the first embodiment described above.

Furthermore, in the incision step, the operator such as the operating surgeon operates the operating portion (not illustrated) such as a foot switch while maintaining the fifth state (FIG. 15) or the sixth state (FIG. 16) of the treatment tool insertion portion 7C by the third protruding operation on the first slider 82, and energizes the knife 11 with a high frequency current from the power source 100. After that, the operator such as the operating surgeon makes an incision on the entire periphery of the target site T1 while confirming the marking sign T2, as in the first embodiment described above.

In addition, in the surgical site cleaning, the operator such as the operating surgeon sets the treatment tool insertion portion 7C to the fourth state (FIG. 14) by the first retreating operation on the first slider 82. Alternatively, the operator such as the operating surgeon sets the treatment tool insertion portion 7C to the fifth state (FIG. 15) by the third protruding operation on the first slider 82. After that, the operator such as the operating surgeon operates the operating portion (not illustrated) such as a foot switch to supply the physiological saline solution from the water supply source 200. Due to this, the physiological saline solution is discharged from the distal end of the knife 11, and the surgical site is cleaned in the same manner as in the first embodiment described above.

Even when the treatment tool insertion portion 7C according to the fourth embodiment described above is adopted, the same effects as those of the first embodiment described above can be obtained.

In addition, since the first advancing/retreating portion 12 and the second slider 83 can be omitted, the configuration of the treatment tool 6 for an endoscope can be simplified.

Other Embodiments

Although the modes for carrying out the disclosure have been described above, the disclosure should not be limited only to the first to fourth embodiments described above.

In the first to fourth embodiments described above, the shape of the protrusion portion 112 is not limited to the shapes described above in the first to fourth embodiments, and other shapes may also be adopted.

Figure 17A:
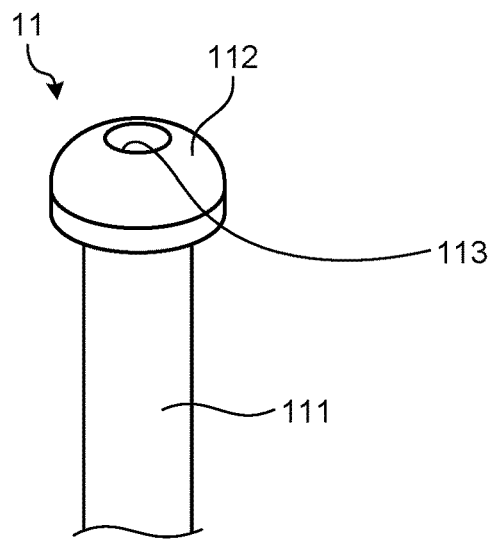
FIG. 17A is a diagram illustrating an example of a shape of a protrusion portion.
Figure 17B:
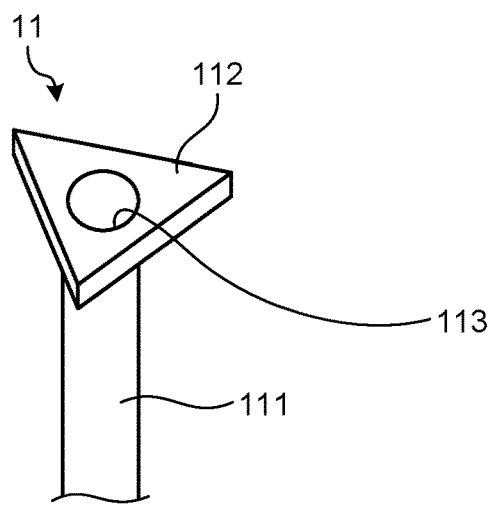
FIG. 17B is a diagram illustrating an example of a shape of a protrusion portion.
Figure 17C:
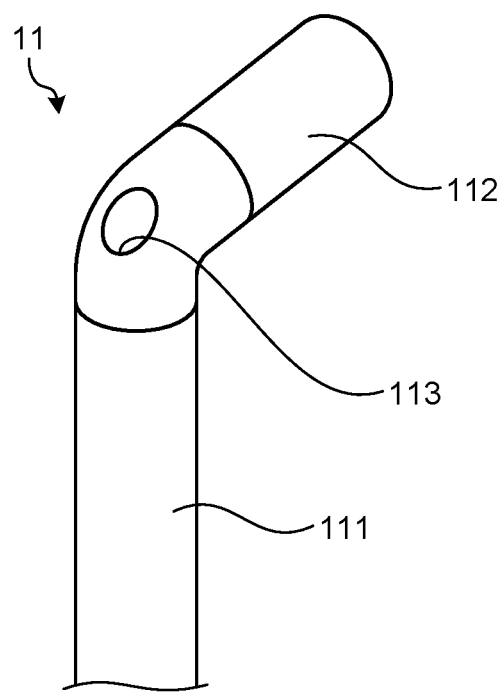
FIG. 17C is a diagram illustrating an example of a shape of a protrusion portion.

FIGS. 17A to 17C are diagrams illustrating an example of the shape of the protrusion portion 112.

Specifically, as illustrated in FIGS. 17A to 17C, the protrusion portion 112 may have a flange shape such as a hemispherical shape (FIG. 17A) or a triangular shape (FIG. 17B), but the disclosure is not limited to the flange shape, and the protrusion portion 112 may have a hook shape (FIG. 17C).

In the first to fourth embodiments described above, the knife 11 is configured to be able to advance and retreat, but the disclosure is not limited thereto, and the knife 11 may be unable to advance and retreat. That is, the configuration in which the knife 11 is always in any of the following states (1) and (2) may be adopted.

(1) The knife 11 is always in a state of protruding from the distal end of the sheath 9 by the maximum protrusion length (for example, the states of FIGS. 7 and 8).

(2) The knife 11 is always in a state in which only the protrusion portion 112 protrudes from the first hole 921 to the outside of the distal end part 92 (for example, the state of FIG. 6).

An endoscope treatment tool according to the disclosure can adjust a pressure of a discharged fluid with a simple configuration.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An endoscope treatment tool, comprising:
a sheath;
a knife inserted into the sheath;
a connecting unit located inside the sheath, the connecting unit including a cavity;
a body located in the cavity, the body configured to move relative to the knife;
a first member inserted into the sheath; and
a second member inserted into the sheath,
wherein the first member is translatable relative to the sheath,
wherein the first member is connected to the body,
wherein the second member is translatable relative to the sheath,
wherein the second member is connected to the knife via the connecting unit
wherein the second member has a cylindrical shape,
wherein the first member is inserted into the second member, and
wherein the first member is translatable relative to the second member.

2. The endoscope treatment tool according to claim 1, wherein the body has a proximal end and a distal end, and a passage extends from the distal end of the body to the proximal end of the body.

3. The endoscope treatment tool according to claim 2, wherein the knife has a first channel extending from a distal end of the knife to a proximal end of the knife, and wherein a cross-sectional area of the passage is smaller than a cross-sectional area of the first channel.

4. The endoscope treatment tool according to claim 2, wherein the passage is a gap formed between an outer peripheral surface of the body and the cavity.

5. The endoscope treatment tool according to claim 3, wherein a ratio of the cross-sectional area of the first channel to the cross-sectional area of the passage defines a first ratio,
wherein a ratio of a cross-sectional area of the cavity to the cross-sectional area of the passage defines a second ratio, and
wherein the first ratio is smaller than the second ratio.

6. The endoscope treatment tool according to claim 3, wherein the body moves in the cavity between a first position and a second position,
wherein, in the first position, the body is closer to the proximal end of the knife than in the second position, and
wherein, in the second position, the body is further from the proximal end of the knife than in the first position.

7. The endoscope treatment tool according to claim 6, wherein, in the first position, a distal end surface of the body contacts the proximal end of the knife.

8. The endoscope treatment tool according to claim 6, wherein the cavity is internal to the connecting unit and defines a storage path,
wherein the passage in the body defines a second channel, and
wherein, in the second position, a portion of the storage path is located between the first channel and the second channel.

9. The endoscope treatment tool according to claim 6, wherein, in the first position, an opening on a proximal end side of the first channel is partially covered by the body.

10. The endoscope treatment tool according to claim 6, wherein the connecting unit includes a fitting channel on a distal end side of the connecting unit,
wherein one end of the fitting channel opens into the cavity, and
wherein the proximal end of the knife is inserted into the fitting channel.

11. The endoscope treatment tool according to claim 10, wherein the one end of the fitting channel is on a proximal end side of the fitting channel, and
wherein, in the first position, the one end of the fitting channel is partially covered by the body.

12. The endoscope treatment tool according to claim 1, wherein the first member is a flexible coil.

13. The endoscope treatment tool according to claim 1, wherein the second member includes a main passage in communication with the passage and configured to flow a fluid toward the passage.

14. The endoscope treatment tool according to claim 13, wherein the main passage is provided between an inner peripheral surface of the second member and an outer peripheral surface of the first member, and the second member has a communication channel that connects the main passage with the cavity.

15. The endoscope treatment tool according to claim 14, wherein the passage includes:
a groove formed form the outer peripheral surface of the body to a distal end surface of the body.

16. The endoscope treatment tool according to claim 13, wherein the first member has a cylindrical shape,
wherein a first portion of the main passage is located between an inner peripheral surface of the second member and an outer peripheral surface of the first member, and
wherein a second portion of the main passage is located inside the first member.

17. The endoscope treatment tool according to claim 1, further comprising:
a wire connecting to the body, the wire configured to move with the body relative to the knife.

* * * * *